US011402845B2

(12) United States Patent
Templeton et al.

(10) Patent No.: US 11,402,845 B2
(45) Date of Patent: *Aug. 2, 2022

(54) WIDE-VIEW LIDAR WITH AREAS OF SPECIAL ATTENTION

(71) Applicant: Waymo LLC, Mountain View, CA (US)

(72) Inventors: Bradley Templeton, Sunnyvale, CA (US); Pierre-Yves Droz, Mountain View, CA (US); Jiajun Zhu, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,597

(22) Filed: Nov. 23, 2020

(65) Prior Publication Data

US 2021/0103289 A1   Apr. 8, 2021

Related U.S. Application Data

(63) Continuation of application No. 16/190,300, filed on Nov. 14, 2018, now Pat. No. 10,871,779, which is a (Continued)

(51) Int. Cl.
*G05D 1/02* (2020.01)
*G01S 17/42* (2006.01)
(Continued)

(52) U.S. Cl.
CPC .......... *G05D 1/0231* (2013.01); *G01S 7/4802* (2013.01); *G01S 7/484* (2013.01);
(Continued)

(58) Field of Classification Search
CPC ........... B60R 22/00; E05F 15/00; G05D 1/00; G05D 3/00; G06F 7/00; G06F 17/00
See application file for complete search history.

(56) References Cited

U.S. PATENT DOCUMENTS 4,397,549 A   8/1983   Morgan
4,926,174 A   5/1990   Fiori, Jr.
(Continued)

FOREIGN PATENT DOCUMENTS

AU   2004252884 A1   1/2005
CA      2042741 A1   6/1992
(Continued)

OTHER PUBLICATIONS

NPL, Golden, Michael et al., LIDAR Remote Sensing Data Collection, Rouge River-Siskiyou National Forest, Ashland, Oregon Study Area, Sep. 2006 (Watershed Sciences, Applied Remote Sensing and Analysis)(Sep. 2006)( https://www.oregongeology.org/pubs/ldq/reports/Ashland_LiDAR_Report_2006.pdf).*

(Continued)

*Primary Examiner* — Jean Paul Cass
(74) *Attorney, Agent, or Firm* — McDonnell Boehnen Hulbert & Berghoff LLP

(57) ABSTRACT

A system and method include scanning a light detection and ranging (LIDAR) device through a range of orientations corresponding to a scanning zone while emitting light pulses from the LIDAR device. The method also includes receiving returning light pulses corresponding to the light pulses emitted from the LIDAR device and determining initial point cloud data based on time delays between emitting the light pulses and receiving the corresponding returning light pulses and the orientations of the LIDAR device. The initial point cloud data has an initial angular resolution. The method includes identifying, based on the initial point cloud data, a reflective feature in the scanning zone and determining an enhancement region and an enhanced angular resolution for a subsequent scan to provide a higher spatial resolution in at least a portion of subsequent point cloud data (Continued)

from the subsequent scan corresponding to the reflective feature.

20 Claims, 20 Drawing Sheets

Related U.S. Application Data continuation of application No. 15/988,612, filed on May 24, 2018, which is a continuation of application No. 15/170,470, filed on Jun. 1, 2016, now Pat. No. 9,983,590, which is a continuation of application No. 13/627,623, filed on Sep. 26, 2012, now Pat. No. 9,383,753.

(51) Int. Cl.
*G01S 17/89* (2020.01)
*G01S 7/48* (2006.01)
*G01S 7/484* (2006.01)
*G01S 17/86* (2020.01)
*G01S 17/931* (2020.01)
*G01S 7/4865* (2020.01)
*G01S 17/10* (2020.01)

(52) U.S. Cl.
CPC ............ *G01S 7/4865* (2013.01); *G01S 17/10* (2013.01); *G01S 17/42* (2013.01); *G01S 17/86* (2020.01); *G01S 17/89* (2013.01); *G01S 17/931* (2020.01); *G05D 1/024* (2013.01); *G05D 1/0246* (2013.01); *G05D 2201/0213* (2013.01)

(56) References Cited

U.S. PATENT DOCUMENTS

| | | | |
|---|---|---|---|
| 5,241,314 A | 8/1993 | Keeler et al. | |
| 5,241,481 A | 8/1993 | Olsen | |
| 5,257,085 A * | 10/1993 | Ulich | G01J 3/2823 356/73 |
| 5,442,358 A | 8/1995 | Keeler et al. | |
| 5,467,122 A | 11/1995 | Bowker et al. | |
| 5,485,009 A | 1/1996 | Meyzonnetie et al. | |
| 5,767,519 A | 6/1998 | Gelbwachs | |
| 5,793,491 A | 8/1998 | Wangler et al. | |
| 5,835,204 A | 11/1998 | Urbach | |
| 5,988,862 A | 11/1999 | Kacyra et al. | |
| 6,224,589 B1 | 5/2001 | Brenner et al. | |
| 6,246,468 B1 | 6/2001 | Dimsdale | |
| 6,275,514 B1 * | 8/2001 | Katzir | B23K 26/0622 372/5 |
| 6,420,698 B1 | 7/2002 | Dimsdale | |
| 6,721,679 B2 | 4/2004 | Aoyama | |
| 6,741,363 B1 | 5/2004 | Kaupert | |
| 7,085,637 B2 | 8/2006 | Breed et al. | |
| 7,123,351 B1 | 10/2006 | Schaefer | |
| 7,221,437 B1 | 5/2007 | Schaefer | |
| 7,262,402 B2 | 8/2007 | Niclass et al. | |
| 7,323,670 B2 | 1/2008 | Walsh et al. | |
| 7,453,552 B1 * | 11/2008 | Miesak | G01S 7/497 356/5.01 |
| 7,502,688 B2 | 3/2009 | Hirokawa | |
| 7,508,344 B2 * | 3/2009 | Stroud | G01S 5/12 342/387 |
| 7,583,364 B1 * | 9/2009 | Mayor | G01S 7/484 356/337 |
| 7,609,875 B2 * | 10/2009 | Liu | G01B 11/24 359/287 |
| 7,684,016 B1 | 3/2010 | Schaefer | |
| 7,831,061 B1 | 11/2010 | Lubard et al. | |
| 7,944,548 B2 | 5/2011 | Eaton | |
| 7,961,301 B2 * | 6/2011 | Earhart | G01S 7/4816 356/5.01 |
| 7,969,558 B2 | 6/2011 | Hall | |
| 8,060,271 B2 | 11/2011 | Dolgov et al. | |
| 8,126,642 B2 | 2/2012 | Trepagnier et al. | |
| 8,194,986 B2 * | 6/2012 | Conwell | G06T 3/00 382/224 |
| 8,385,971 B2 * | 2/2013 | Rhoads | G06V 10/462 382/312 |
| 8,393,964 B2 * | 3/2013 | Huang | A63F 13/06 463/36 |
| 8,451,432 B2 | 5/2013 | Crawford et al. | |
| 8,467,071 B2 | 6/2013 | Steffey et al. | |
| 8,467,133 B2 * | 6/2013 | Miller | G06Q 30/02 359/13 |
| 8,472,120 B2 * | 6/2013 | Border | G02B 27/017 359/13 |
| 8,537,338 B1 | 9/2013 | Medasani et al. | |
| 8,537,376 B2 | 9/2013 | Brown et al. | |
| 8,538,636 B2 * | 9/2013 | Breed | G01S 7/539 362/465 |
| 8,675,181 B2 | 3/2014 | Hall | |
| 8,724,119 B2 | 5/2014 | Steffey et al. | |
| 8,767,190 B2 | 7/2014 | Hall | |
| 8,902,408 B2 | 12/2014 | Bridges | |
| 9,153,067 B2 | 10/2015 | Dobes et al. | |
| 9,164,173 B2 | 10/2015 | Bridges et al. | |
| 9,395,174 B2 | 7/2016 | Bridges | |
| 9,400,170 B2 | 7/2016 | Steffey | |
| RE46,672 E | 1/2018 | Hall | |
| 9,983,590 B2 | 5/2018 | Templeton et al. | |
| 10,048,358 B2 | 8/2018 | Berger et al. | |
| 10,089,516 B2 | 10/2018 | Popovich et al. | |
| 10,109,183 B1 | 10/2018 | Franz et al. | |
| 10,122,416 B2 | 11/2018 | Berger et al. | |
| 10,145,533 B2 | 12/2018 | Popovich et al. | |
| 10,156,681 B2 | 12/2018 | Waldren et al. | |
| 10,185,154 B2 | 1/2019 | Popovich et al. | |
| 10,209,517 B2 | 2/2019 | Popovich et al. | |
| 10,211,593 B1 | 2/2019 | Lingvay et al. | |
| 10,216,061 B2 | 2/2019 | Popovich et al. | |
| 10,310,058 B1 | 6/2019 | Campbell et al. | |
| 10,317,529 B2 | 6/2019 | Shu et al. | |
| 10,324,170 B1 | 6/2019 | Engberg, Jr. et al. | |
| 10,330,777 B2 | 6/2019 | Popovich et al. | |
| 10,340,651 B1 | 7/2019 | Drummer et al. | |
| 10,348,051 B1 | 7/2019 | Shah et al. | |
| 10,359,736 B2 | 7/2019 | Popovich et al. | |
| 10,386,487 B1 | 8/2019 | Wilton et al. | |
| 10,423,222 B2 | 9/2019 | Popovich et al. | |
| 10,451,716 B2 | 10/2019 | Hughes et al. | |
| 10,545,346 B2 | 1/2020 | Waldern et al. | |
| 10,591,756 B2 | 3/2020 | Popovich et al. | |
| RE47,942 E | 4/2020 | Hall | |
| 10,871,779 B2 | 12/2020 | Templeton et al. | |
| 2003/0006048 A1 | 1/2003 | Marriott, Jr. et al. | |
| 2003/0210720 A1 | 11/2003 | Reid | |
| 2004/0141170 A1 | 7/2004 | Jamieson et al. | |
| 2005/0201437 A1 | 9/2005 | Reid et al. | |
| 2006/0176697 A1 | 8/2006 | Arruda | |
| 2006/0202129 A1 | 9/2006 | Niclass et al. | |
| 2006/0254522 A1 * | 11/2006 | Shaw | A01K 29/005 119/6.5 |
| 2007/0097849 A1 * | 5/2007 | Sakamoto | G11B 20/10 |
| 2008/0162027 A1 | 7/2008 | Murphy et al. | |
| 2008/0172156 A1 | 7/2008 | Joh et al. | |
| 2008/0192228 A1 * | 8/2008 | Eaton | G01S 17/89 356/5.01 |
| 2008/0219300 A1 * | 9/2008 | Krupkin | H01S 3/2383 372/6 |
| 2008/0294315 A1 * | 11/2008 | Breed | B60N 2/002 701/49 |
| 2009/0010644 A1 * | 1/2009 | Varshneya | G01S 7/481 398/33 |
| 2009/0080712 A1 * | 3/2009 | D'Souza | G06V 20/52 382/117 |
| 2009/0112407 A1 * | 4/2009 | Kneller | B64D 11/0015 701/45 |
| 2009/0122295 A1 * | 5/2009 | Eaton | G01S 17/87 342/357.31 |

(56) References Cited

U.S. PATENT DOCUMENTS

| | | |
|---|---|---|
| 2009/0279069 A1 | 11/2009 | Jensen et al. |
| 2010/0026850 A1 | 2/2010 | Katz |
| 2010/0039318 A1* | 2/2010 | Kmiecik ............... G01C 21/165 342/357.65 |
| 2010/0053593 A1 | 3/2010 | Bedros et al. |
| 2010/0104199 A1 | 4/2010 | Zhang et al. |
| 2010/0110165 A1 | 5/2010 | Iizuka |
| 2010/0118116 A1 | 5/2010 | Tomasz et al. |
| 2010/0198488 A1 | 8/2010 | Groitzsch et al. |
| 2010/0277714 A1* | 11/2010 | Pedersen ................. G01S 7/497 356/28 |
| 2011/0040482 A1 | 2/2011 | Brimble et al. |
| 2011/0093411 A1* | 4/2011 | Gibson ................. G06Q 99/00 705/500 |
| 2011/0122402 A1* | 5/2011 | Westphal ........... G01N 21/6408 356/217 |
| 2011/0216304 A1* | 9/2011 | Hall ...................... G01S 7/4813 356/4.01 |
| 2011/0274343 A1 | 11/2011 | Krishnaswamy et al. |
| 2011/0279366 A1 | 11/2011 | Lohbihler |
| 2011/0305250 A1 | 12/2011 | Chann et al. |
| 2012/0069321 A1 | 3/2012 | Quilligan et al. |
| 2012/0135745 A1* | 5/2012 | Kaplan .................. G01C 21/32 455/456.1 |
| 2012/0257187 A1 | 10/2012 | Stutz et al. |
| 2013/0223686 A1 | 8/2013 | Shimizu et al. |
| 2013/0242283 A1* | 9/2013 | Bailey ..................... G01S 17/89 977/734 |
| 2013/0250272 A1 | 9/2013 | Ludwig |
| 2013/0300838 A1 | 11/2013 | Borowski |
| 2014/0002439 A1* | 1/2014 | Lynch ................... G06T 3/4053 345/419 |
| 2014/0300892 A1 | 10/2014 | Zogg et al. |
| 2014/0340487 A1* | 11/2014 | Gilliland .............. H04N 13/167 348/48 |
| 2015/0192676 A1* | 7/2015 | Kotelnikov ............ G01S 17/89 356/5.03 |
| 2015/0202939 A1* | 7/2015 | Stettner ................ B60G 17/019 701/45 |
| 2016/0047895 A1* | 2/2016 | Dussan ................... G01S 17/42 356/4.01 |
| 2016/0047896 A1* | 2/2016 | Dussan ................. G01S 7/4817 356/4.01 |
| 2016/0047897 A1* | 2/2016 | Dussan ................. G01S 17/931 356/4.01 |
| 2016/0047898 A1* | 2/2016 | Dussan ................. G01S 7/4817 356/4.01 |
| 2016/0047899 A1* | 2/2016 | Dussan ................. G01S 7/4817 356/4.01 |
| 2016/0047900 A1* | 2/2016 | Dussan ................... G01S 17/87 356/4.01 |
| 2016/0047901 A1 | 2/2016 | Pacala et al. |
| 2016/0047903 A1* | 2/2016 | Dussan ................... G01S 17/89 356/5.01 |
| 2016/0181762 A1* | 6/2016 | Dawson .................. G02B 6/42 372/6 |
| 2016/0313445 A1* | 10/2016 | Bailey ................... G01S 7/4816 |
| 2017/0031363 A1* | 2/2017 | Laur ..................... G01S 13/931 |
| 2017/0051884 A1* | 2/2017 | Raring ................... H01S 5/023 |
| 2017/0082750 A1* | 3/2017 | Schultz ................. G01C 11/04 |
| 2017/0269213 A1 | 9/2017 | Luthi et al. |
| 2017/0350967 A1 | 12/2017 | Wilton et al. |
| 2018/0284247 A1 | 10/2018 | Campbell et al. |
| 2018/0284277 A1 | 10/2018 | LaChapelle et al. |
| 2018/0334405 A1 | 11/2018 | Buellesfeld et al. |
| 2018/0372874 A1 | 12/2018 | Lipson et al. |
| 2020/0103501 A1 | 4/2020 | Kotelnikov et al. |

FOREIGN PATENT DOCUMENTS

| | | |
|---|---|---|
| CA | 2527895 A1 | 1/2005 |
| DE | 102008007451 A1 | 8/2009 |
| EP | 2388615 A1 | 11/2011 |
| WO | 2005001511 A1 | 1/2005 |
| WO | 2006027339 A2 | 3/2006 |
| WO | WO 2012/085149 * | 12/2010 |
| WO | 2011127375 A1 | 10/2011 |
| WO | 2012085149 A1 | 6/2012 |
| WO | 2013186160 A1 | 12/2013 |

OTHER PUBLICATIONS

ICT Results, "Light-based Localisation for Robotic Systems", Apr. 16, 2012.

Illmann, U., Derwent Publication No. 2006-307254 for patent family De 102004051147A1 dated Apr. 20, 2006 entitled "Pulse Train Generating Method for Scanning Laser Distance Measuring Apparatus in Passive Optical Multiplier With Pulse of Pulsed Laser, e.g. Microchip Laser Led by Optical Cable or Fibre Into Radiation Splitter for Processing" 3 pages.

Golden, M., LiDAR Remote Sensing Data Collection: Rogue River-Siskiyou National Forest, Ashland, Oregon Study Area, Applied Remote Sensing and Analysis, Sep. 2006, 21 pages.

\* cited by examiner

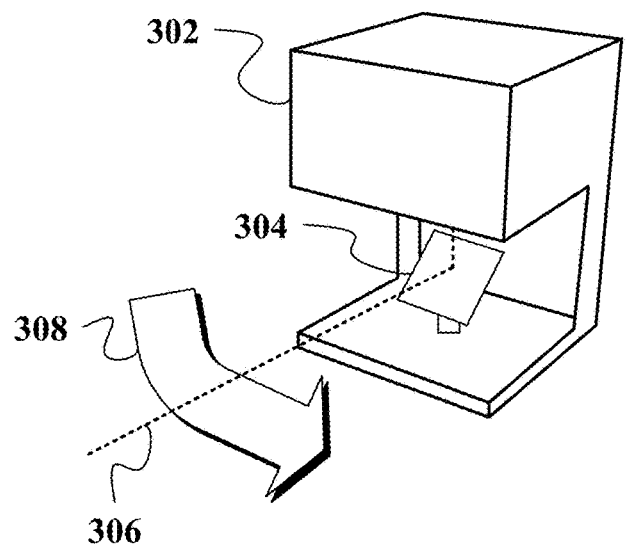
Figure 3A
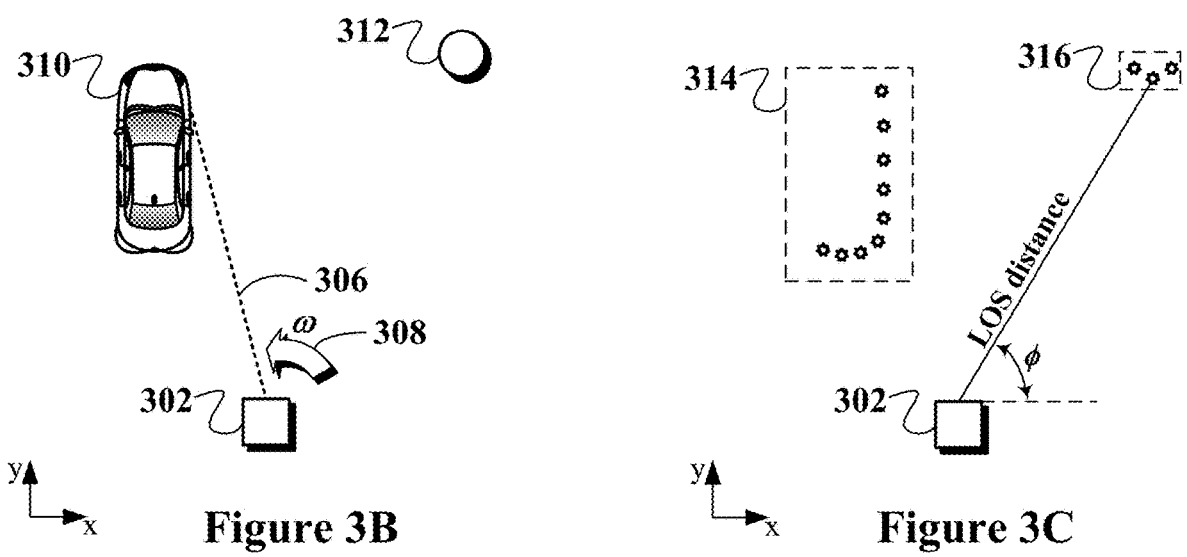
Figure 3B
Figure 3C

WIDE-VIEW LIDAR WITH AREAS OF SPECIAL ATTENTION

CROSS-REFERENCE TO RELATED APPLICATIONS

This application is a continuation of U.S. patent application Ser. No. 16/190,300, filed Nov. 14, 2018, which is a continuation of U.S. patent application Ser. No. 15/988,612, filed May 24, 2018, which is a continuation of U.S. patent application Ser. No. 15/170,470 filed Jun. 1, 2016, which is a continuation of U.S. patent application Ser. No. 13/627,623 filed Sep. 26, 2012. The foregoing applications are incorporated herein by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR actively estimates distances to environmental features while scanning through a scene to assembly a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

The angular resolution of a LIDAR system is defined by at least two parameters, the effective solid angle of each emitted light pulse, and the angular separation between each adjacent measurement point. The solid angle defined by each emitted light pulse is influenced by the narrowness of the emitted pulse (e.g., the amount of beam divergence) and also by atmospheric scattering effects, potential diffraction on the environmental reflective surfaces, etc. The angular separation between adjacent measurement points is influenced by the timing budget of the LIDAR system (e.g., the allowable refresh rate for complete scans of the scene), the total solid angle of the scene being scanned. In some systems lenses are employed to partially diverge emitted pulses such that the solid angle of each emitted pulse is comparable to the angular separation between adjacent points. Diverging the emitted pulses creates broader, less precise, individual measurement points, but allows each measurement point to sample a broader angular region of the scene and thereby avoid missing features situated between adjacent measurement points.

SUMMARY

A LIDAR device configured to provide dynamically adjustable angular resolution is disclosed herein. The LIDAR device is driven to provide enhanced angular resolution of identified regions of a scanning zone by adjusting one or both of its laser pulse rate or beam slew rate. Regions for enhanced resolution scanning are identified according to techniques to select regions of the environmental scene where enhanced resolution scans will inform navigational determinations, object detection, obstacle avoidance, etc. Techniques are disclosed to identify: edges of perceived objects; moving objects and/or predicted locations thereof; distant objects; objects that lack sufficient resolution to allow reliable identification; and/or objects not present in a prior baseline scan of the same scene. Modifying one or both of the angular rate of change or the pulse rate modifies the amount of angular change between each successive pulse emitted from the LIDAR sensor, and thereby modifies the angular resolution of the point cloud output from the LIDAR system. In some examples, a second LIDAR device provides high resolution scanning of regions identified according to point cloud information from a first LIDAR device providing wide-view scanning resolutions.

In an aspect, a method is disclosed. The method includes scanning a light detection and ranging (LIDAR) device through a range of orientations corresponding to a scanning zone while emitting light pulses from the LIDAR device. The method also includes receiving returning light pulses corresponding to the light pulses emitted from the LIDAR device. The method further includes determining initial point cloud data based on time delays between emitting the light pulses and receiving the corresponding returning light pulses and the orientations of the LIDAR device. The initial point cloud data has an initial angular resolution. The method also includes identifying, based on the initial point cloud data, a reflective feature in the scanning zone. The method yet further includes locating at least one edge of the reflective feature. The method also includes, based on the located at least one edge of the reflective feature, determining an enhancement region and an enhanced angular resolution for a subsequent scan, wherein the enhanced angular resolution is determined so as to provide a higher spatial resolution in at least a portion of subsequent point cloud data from the subsequent scan, wherein the portion corresponds to the reflective feature.

In an aspect, an autonomous vehicle system is provided. The system includes a light detection and ranging (LIDAR) device including a light source configured to be scanned through a range of orientations directed to a scanning zone while emitting light pulses and a light detector configured to receive returning light pulses reflected from features in the scanning zone, if any, each of the returning light pulses corresponding to an emitted light pulse. The system also includes a controller configured to cause the LIDAR device to scan the scanning zone while emitting light pulses at a first pulse rate. The controller is also configured to receive information from the LIDAR device indicative of the time delays between the emission of the light pulses and the reception of the corresponding returning light pulses. The controller is further configured to determine, based on the time delays and orientations of the LIDAR device associated with each time delay, initial point cloud data having an initial angular resolution. The controller is also configured to identify, based on the initial point cloud data, a reflective feature in the scanning zone and locate at least one edge of the reflective feature. The controller is further configured to, based on the located at least one edge of the reflective feature, determine an enhancement region and an enhanced angular resolution for a subsequent scan. The enhanced angular resolution is determined so as to provide a higher spatial resolution in at least a portion of subsequent point cloud data from the subsequent scan. The portion corresponds to the reflective feature.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 3A provides an example depiction of a LIDAR device including beam steering optics.

FIG. 3B symbolically illustrates a LIDAR device scanning across an obstacle-filled environmental scene.

FIG. 3C symbolically illustrates a point cloud corresponding to the obstacle-filled environmental scene of FIG. 3B.

DETAILED DESCRIPTION

Figure 1:
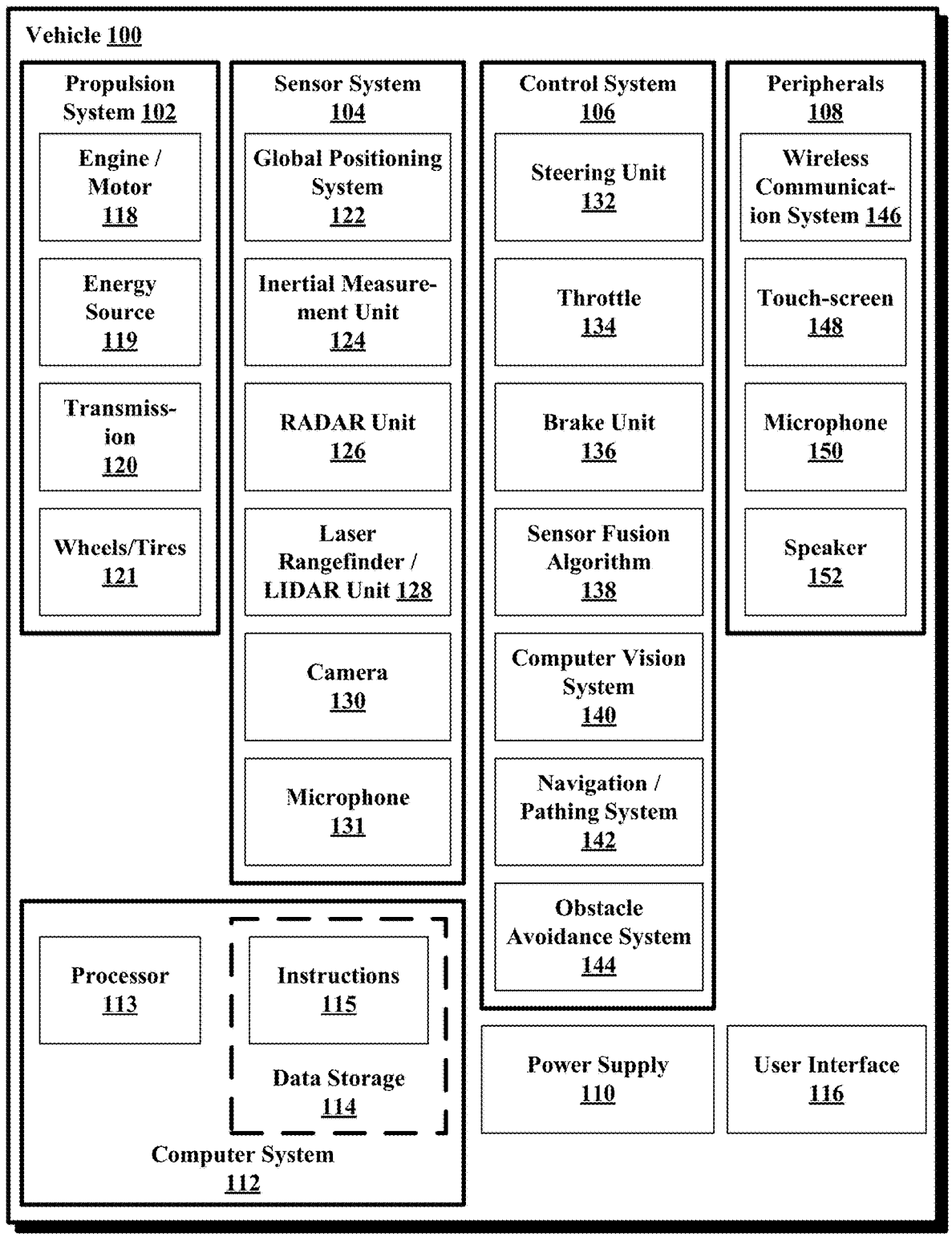
FIG. 1 is a functional block diagram depicting aspects of an autonomous vehicle.

Example embodiments relate to an autonomous vehicle, such as a driverless automobile, that includes a light detection and ranging (LIDAR) sensor for actively detecting reflective features in the environment surrounding the vehicle. A controller analyzes information from the LIDAR sensor to identify the surroundings of the vehicle and determines how to direct the propulsion systems of the vehicle to affect a navigation path that substantially avoids obstacles indicated by the information from the LIDAR sensor.

In some embodiments of the present disclosure, the angular resolution of the LIDAR sensor is adjusted to provide enhanced angular resolution scanning in identified regions of an environmental scene. In some examples, the LIDAR device operates by scanning a pulsing laser across a scanning zone, and measuring the time delays until reception of corresponding reflected pulses. The orientation of the LIDAR device for each pulse is combined with the measured time delay to determine the position of the environmental feature responsible for reflecting the pulse. Combining many such points provides a three-dimensional point cloud representing the environmental scene surrounding the vehicle. The pulsing laser can be scanned by directing the laser with optical beam steering optics, such as a rotating angled mirror that directs a fixed laser source according to the angle of the mirror. Some embodiments of the present disclosure provide for adjusting the angular resolution of such a scanning LIDAR system by adjusting one or both of: (1) a pulse rate of the pulsing laser, or (2) an angular rate of change of the beam steering optics. Modifying one or both of the angular rate of change or the pulse rate modifies the amount of angular change between each successive pulse emitted from the LIDAR sensor, and thereby modifies the angular resolution of the point cloud output from the LIDAR system. In some examples, a second LIDAR device provides high resolution scanning of regions identified according to point cloud information from a first LIDAR device providing wide-view scanning resolutions.

Regions to scan with enhanced angular resolution can be automatically identified by analyzing the point cloud information from one or more previous scans and/or the current scan. In some examples, data from one or more previously detected point maps are analyzed to identify regions of the scene that include edges of perceived objects. The next scan can then selectively provide enhanced angular resolution near the edges so as to better define the boundaries of the perceived feature while maintaining standard resolution, or even decreased resolution, in the regions between the edges. Additionally or alternatively, an enhanced resolution region can be indicated by identifying a feature in motion, a feature not present in a baseline map of the scene, or a distant feature. Furthermore, in some examples, enhanced resolution scanning can be initiated before completing a full scan on the basis of a partial point map that includes a discontinuity indicative of an edge of a reflective environmental feature.

The spatial resolution of a LIDAR-generated 3-D point map depends on the physical separation between points, which is a function of both the distance to the points and the angular separation between the points, with respect to the LIDAR. For example, smaller angular separation between measured points provides higher spatial resolution for a given distance, and vice versa. Similarly, smaller distances result in higher spatial resolution for a given angular separation, and vice versa. The angular separation between points is sometimes referred to as the "density" of points, whereby higher density generally corresponds to higher spatial resolution, and vice versa.

Some embodiments of the present disclosure also provide for achieving enhanced angular resolution in a LIDAR system by driving a pulsing laser at a pulse rate that exceeds a maximum sustained pulse rate associated with thermally stable device operation. The maximum sustained thermally stable pulse rate is determined according to thermal device behavior such as heat dissipation characteristics, heat generation in laser components, temperature-dependent behavior of associated optical components, etc. Lasers employed in LIDAR systems therefore have a device-specific maximum sustained pulse rate that allows the device to continuously operate without experiencing adverse thermal effects. In some examples, however, the maximum sustained pulse rate can be temporarily exceeded if followed by a corresponding decrease in pulse rate such that the average pulse rate of the laser system does not exceed the maximum sustained rate.

For a conventional LIDAR system that does not provide adaptive angular resolution adjustments, and instead provides equally spaced sample points across the scanning zone, the maximum theoretical angular resolution of the system is determined by the refresh rate (number of complete scans to be completed per second), the total solid angle scanned during each complete scan, and the maximum sustained pulse rate. In such an arrangement, the minimum theoretical angular separation between equally spaced points is given by:

$$\Omega_{theor} = \Omega_{tot}/[\text{total pulses per scan}],$$

Where $\Omega_{tot}$ is the total solid angle scanned during each scan, and the total pulses per scan is a function of the maximum sustained pulse rate and the refresh rate. For example, the total pulses per scan can be given by $f_{thermal}/f_{refresh}$, where $f_{thermal}$ is the maximum sustained pulse rate, and $f_{refresh}$ is the refresh rate of the LIDAR system.

However, in contrast to conventional systems, some embodiments of the present disclosure allow for adaptively adjusting the angular resolution across a scanning zone to achieve enhanced angular resolutions in identified regions of the scene. For example, the enhanced angular resolutions may exceed the theoretical maximums of conventional LIDAR systems.

Generally, the refresh rate for the LIDAR is set to provide high-resolution, real-time 3-D point maps on a time scale that is relevant to navigation decisions, such as adjustments to propulsion systems of the autonomous vehicle in real time. Thus, in some examples, the refresh rate may be dependent on the vehicle's rate of speed. For example, the refresh rate may be higher at high rates of speeds, because at high speeds potential obstacles (and the need to maneuver around them) tend to develop on relatively short time scales for a potential obstacle at a fixed distance. On the other hand, the refresh rate may be lower at low rates of speed, because at low speeds potential obstacles (and the need to maneuver around them) tend to develop on relatively greater time scales. There may be other factors and/or considerations, as well as other applications of scanning LIDARs, which make rapid generation of high-resolution 3-D point maps in real time necessary or desirable. Moreover, rapid generation of high-resolution 3-D point maps may be important or desirable for reasons other than safety.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as the setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/ motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, road way boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, wireless communication system 146 can communicate with a wireless local area network (WLAN), for example, using WiFi. In some embodiments, wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
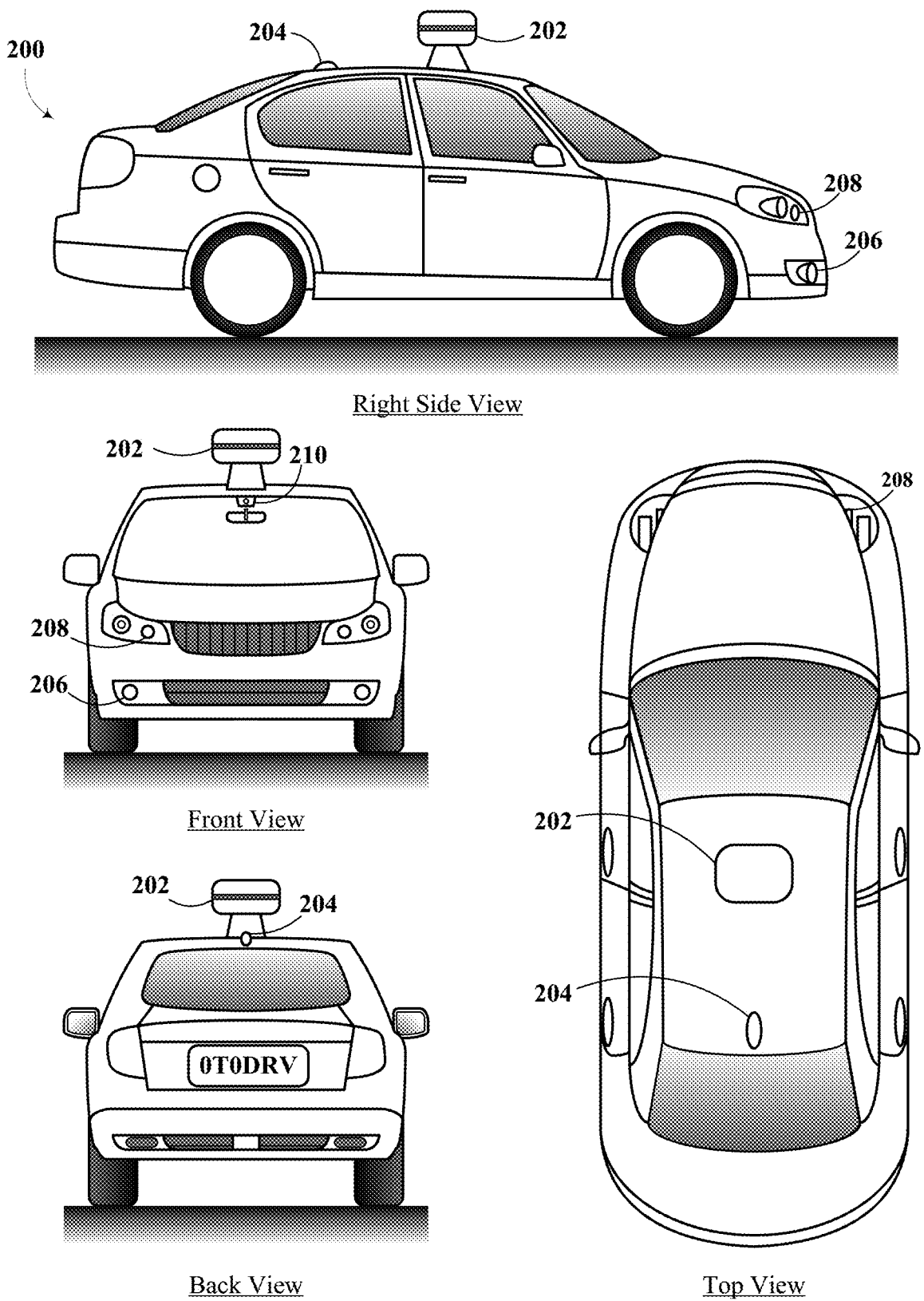
FIG. 2 depicts exterior views of the autonomous vehicle.

FIG. 2 shows an example vehicle 200 that can include all or most of the functions described in connection with vehicle 100 in reference to FIG. 1. Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a LIDAR unit 206, a laser rangefinder unit 208, and a camera 210. Furthermore, the example vehicle 200 can include any of the components described in connection with vehicle 100 of FIG. 1.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200.

The camera 210 can have associated optics operable to provide an adjustable field of view. Further, the camera 210 can be mounted to vehicle 200 with a movable mount to vary a pointing angle of the camera 210, such as a via a pan/tilt mechanism.

FIG. 3A provides an example depiction of a light detection and ranging (LIDAR) device 302 including beam steering optics 304. A laser beam 306 is directed to the beam steering optics 304. In the example illustrated in FIG. 3A, the beam steering optics 304 is a rotating angled mirror that directs the initially downward facing laser beam 306 to sweep across a scanning zone. As described herein, the beam steering optics 304, which can generally be implemented as a combination of lenses, mirrors, and/or apertures configured to direct the laser beam to sweep across a scanning zone, are interchangeably described as the rotating angled mirror 304. The rotating angled mirror 304 rotates about an axis substantially parallel, and roughly in line with, the initial downward path of the laser beam 306. The rotating angled mirror 304 rotates in the direction indicated by the reference arrow 308 in FIG. 3A.

Although rangefinder 302 is depicted as having (approximately) a 180 degree range of rotation for the scanning zone of the laser beam 306 via the rotating angled mirror 304, this is for purposes of example and explanation only, as the present disclosure is not so limited. Indeed, as explained above, LIDAR 302 can be configured to have viewing angle (e.g., angular range of available orientations during each sweep), including viewing angles up to and including 360 degrees. Further, although LIDAR 302 is depicted with the single laser beam 306 and a single mirror 304, this is for purposes of example and explanation only, as the present disclosure is not so limited. Indeed, as explained above, LIDAR 302 can include multiple laser beams operating simultaneously or sequentially to provide greater sampling coverage of the surrounding environment. The LIDAR 302 also includes, or works in concert with, additional optical sensors (not shown) configured to detect the reflection of laser beam 306 from features/objects in the surrounding environment with sufficient temporal sensitivity to determine distances to the reflective features. For example, with reference to the vehicle 200 in FIG. 2, such optical sensors can optionally be co-located with the top-mounted sensors 204 on the autonomous vehicle 200.

FIG. 3B symbolically illustrates the LIDAR device 302 scanning across an obstacle-filled environmental scene. The example vehicular environment depicted in FIG. 3B includes a car 310 and a tree 312. In operation, LIDAR 302 rotates according to motion reference arrow 308 with angular velocity ω. While rotating, the LIDAR 302 regularly (e.g., periodically) emits laser beams, such as the laser beam 306. Reflections from the emitted laser beams by objects in the environment, such as vehicle 310 and tree 312, are then received by suitable sensors. Precisely time-stamping the receipt of the reflected signals allows for associating each reflected signal (if any is received at all) with the most recently emitted laser pulse, and measuring the time delay between emission of the laser pulse and reception of the reflected light. The time delay provides an estimate of the distance to the reflective feature by scaling according to the speed of light in the intervening atmosphere. Combining the distance information for each reflected signal with the orientation of the LIDAR device 302 for the respective pulse emission allows for determining a position of the reflective feature in three-dimensions. For illustrative purposes, the environmental scene in FIG. 3B is described in the two-dimensional x-y plane in connection with a single sweep of the LIDAR device 302 that estimates positions to a series of points located in the x-y plane. However, it is noted that a more complete three-dimensional sampling is provided by either adjusting the beam steering optics 304 to direct the laser beam 306 up or down from the x-y plane on its next sweep of the scene or by providing additional lasers and associated beam steering optics dedicated to sampling point locations in planes above and below the x-y plane shown in FIG. 3B, or combinations of these.

FIG. 3C symbolically illustrates a point cloud corresponding to the obstacle-filled environmental scene of FIG. 3B. Spatial-point data (represented by stars) are shown from a ground-plane (or aerial) perspective. Even though the individual points are not equally spatially distributed throughout the sampled environment, adjacent sampled points are roughly equally angularly spaced with respect to the LIDAR device 302. A car spatial data 314 correspond to measured points on the surface of the car 310 with a line of sight to the LIDAR device 302. Similarly, a tree spatial data 316 correspond to measured points on the surface of the tree 312 visible from the LIDAR device 302. The absence of points between the car spatial data 314 and the tree spatial data 316 indicates an absence of reflective features along the sampled line of sight paths in the plane illustrated.

Each point in the example point cloud illustrated symbolically in FIG. 3C can be referenced by an azimuth angle φ (e.g. orientation of the LIDAR device 302 while emitting the pulse corresponding to the point, which is determined by the orientation of the rotating angled mirror 304) and a line-of-sight (LOS) distance (e.g., the distance indicated by the time delay between pulse emission and reflected light reception). For emitted pulses that do not receive a reflected signal, the LOS distance can optionally be set to the maximum distance sensitivity of the LIDAR device 302. The maximum distance sensitivity can be determined according to the maximum time delay the associated optical sensors wait for a return reflected signal following each pulse emission, which can itself be set according to the anticipated signal strength of a reflected signal at a particular distance given ambient lighting conditions, intensity of the emitted pulse, predicted reflectivity of environmental features, etc. In some examples, the maximum distance can be approximately 60 meters, 80 meters, 100 meters, or 150 meters, but other examples are possible for particular configurations of the LIDAR device 302 and associated optical sensors.

In some embodiments, the sensor fusion algorithm 138, computer vision system 140, and/or computer system 112, can interpret the car spatial data 314 alone and/or in combination with additional sensor-indicated information and/or memory-based pattern-matching point clouds and/or baseline maps of the environment to categorize or identify the group of points 314 as corresponding to the car 310. Similarly, the tree spatial data 316 can identified as corresponding to the tree 310 in accordance with a suitable object-detection technique. As described further herein, some embodiments of the present disclosure provide for identifying a region of the point cloud for study with enhanced resolution scanning technique on the basis of the already-sampled spatial-points.

Further, as noted above, each spatial point can be associated with a respective laser from a set of lasers and a respective timestamp. That is, in an embodiment where the LIDAR 302 includes multiple lasers, each respective received spatial point can be associated with the particular laser that was detected in accordance with the respective received spatial point. Additionally, each respective spatial point can be associated with a respective timestamp (e.g., a time at which laser was emitted or received). In this way, the received spatial points may be organized, identified, or otherwise ordered on a spatial (laser identification) and/or temporal (timestamp) basis. Such an ordering may assist or improve an analysis of the spatial-point data by allowing for organizing the spatial-point data into a meaningful order.

Figure 4A:
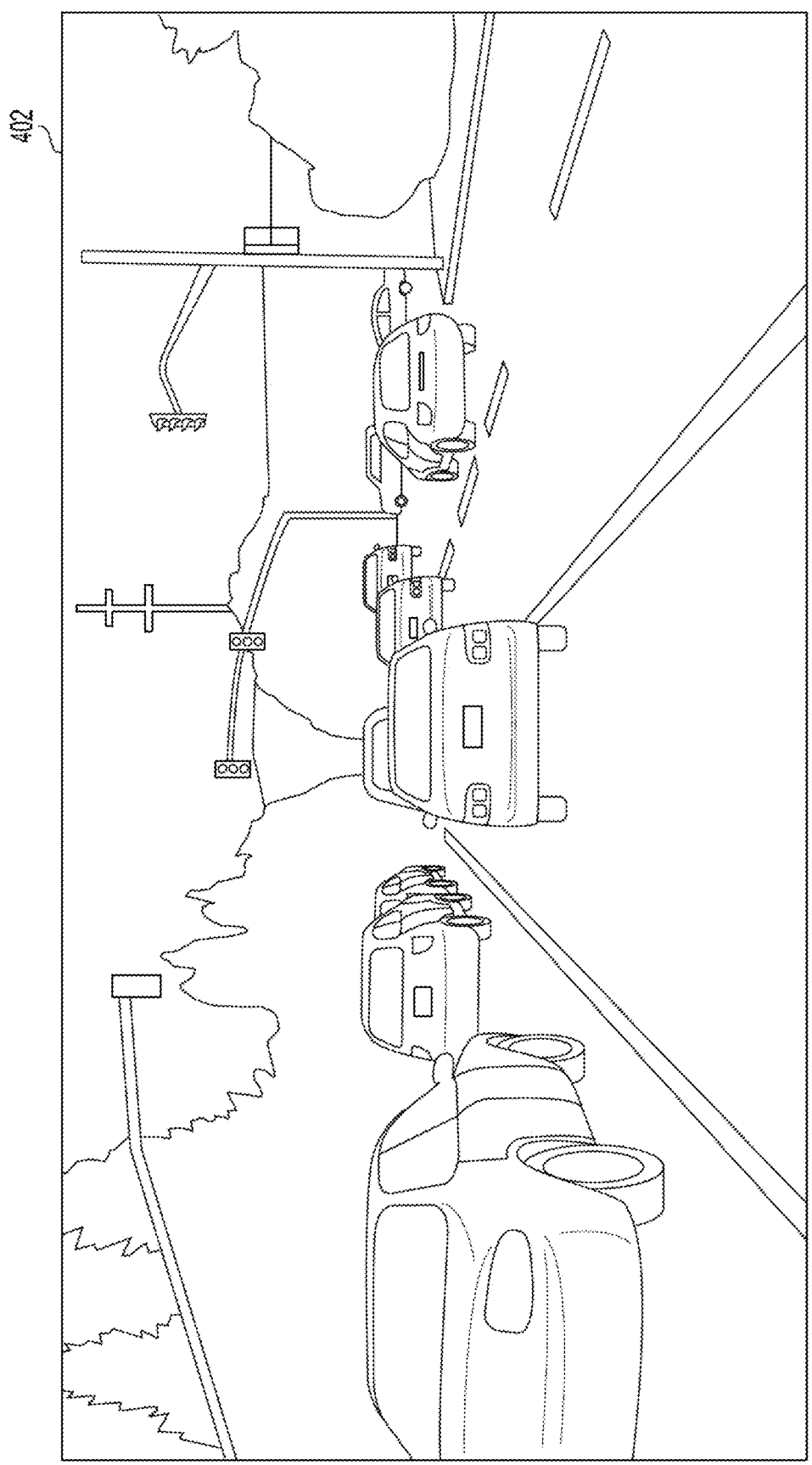
FIG. 4A is a schematic drawing of an example roadway approaching an intersection.
Figure 4B:
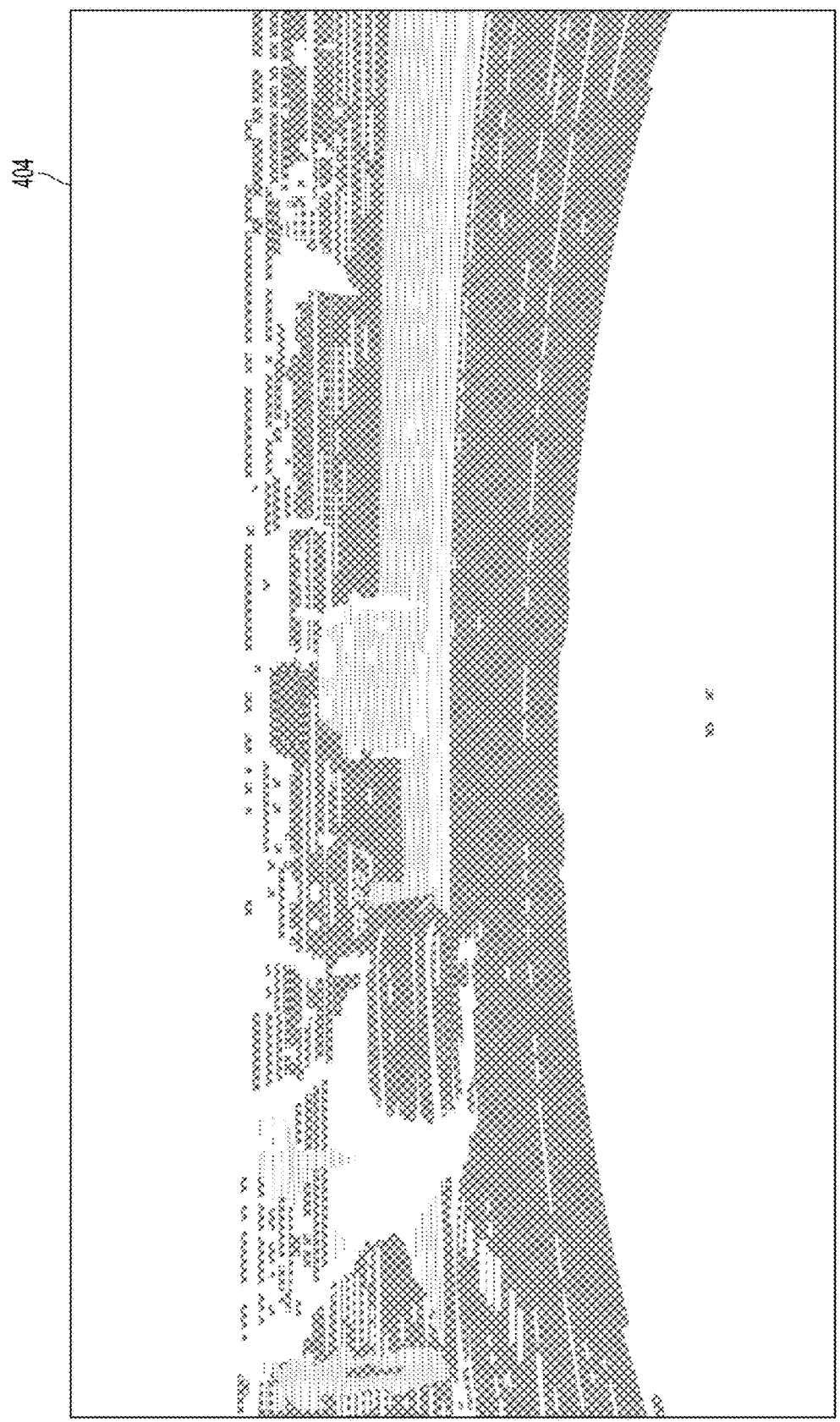
FIG. 4B is a rendering of a LIDAR-indicated point cloud corresponding to the scene pictured in FIG. 4A.
Figure 4C:
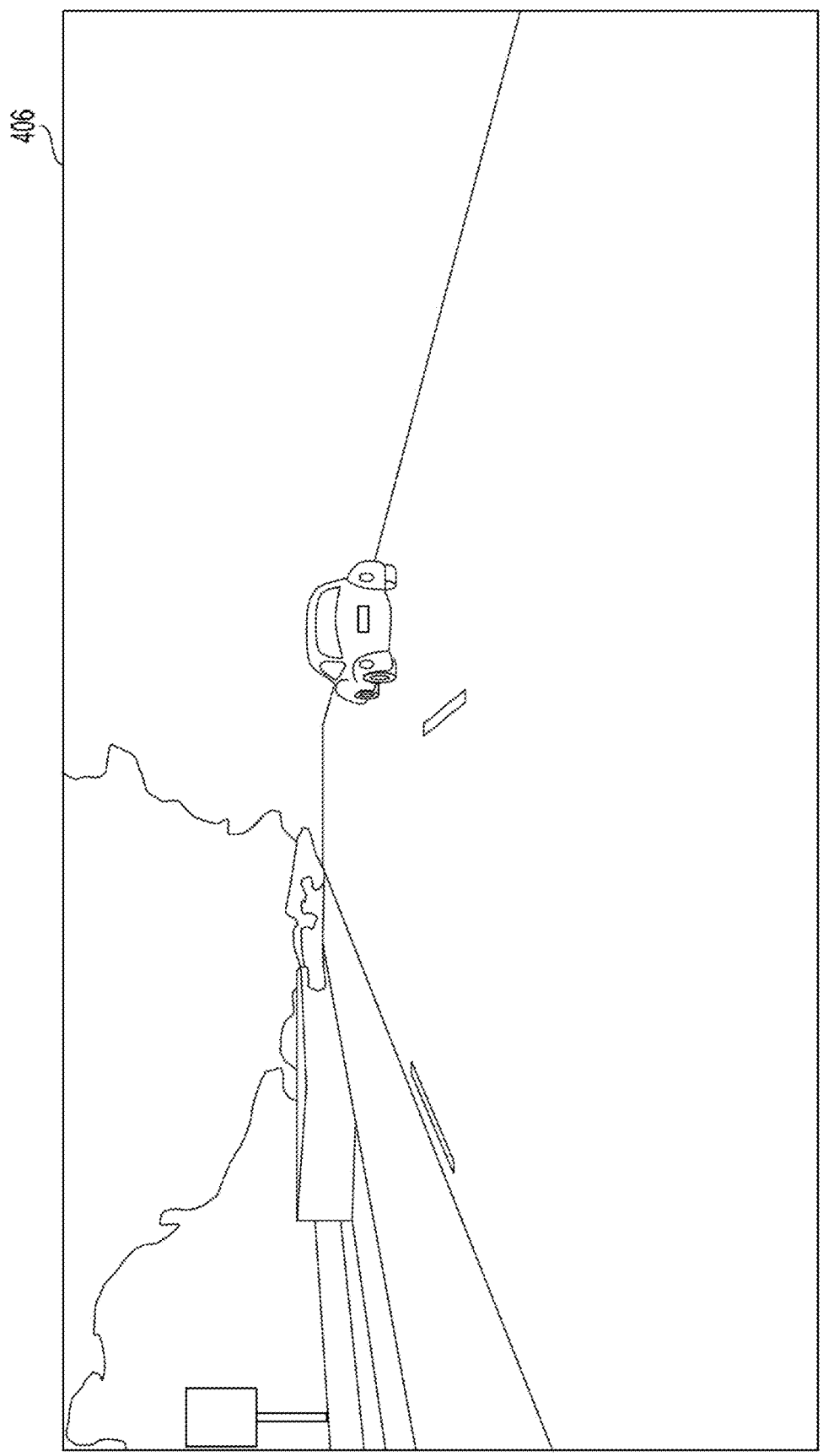
FIG. 4C is a schematic drawing of another example roadway.
Figure 4D:
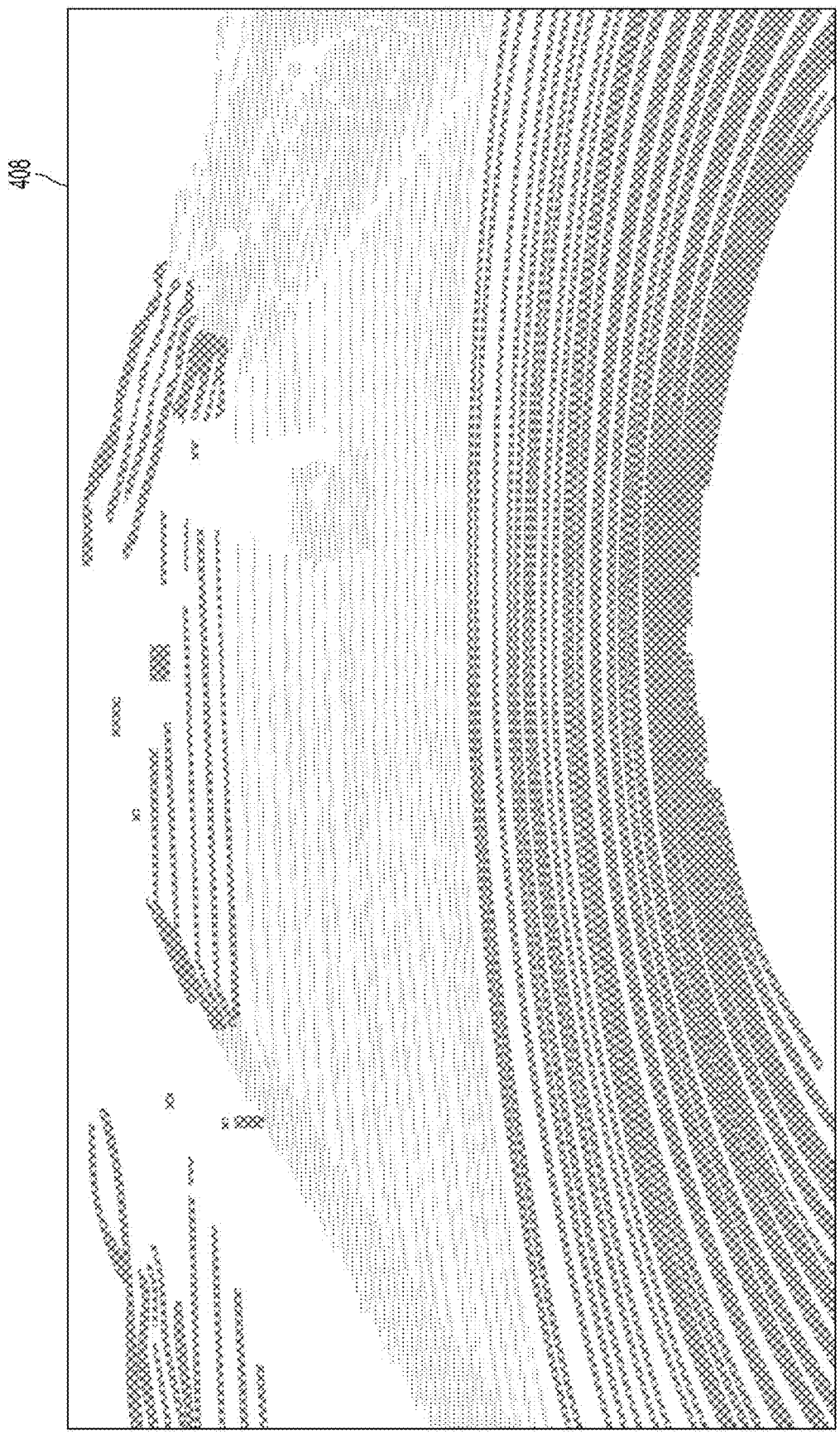
FIG. 4D is a rendering of a LIDAR-indicated point cloud corresponding to the scene pictured in FIG. 4C.

FIG. 4A is a raw camera image of an example roadway scene 402 approaching an intersection. FIG. 4B is a rendering of a LIDAR-indicated point cloud 404 corresponding to the scene 402 pictured in FIG. 4A. FIG. 4C is a raw camera image of another example roadway scene 406. FIG. 4D is a rendering of a LIDAR-indicated point cloud 408 corresponding to the scene 406 pictured in FIG. 4C.

With reference to the vehicle 200 of FIG. 2, the camera images 402, 406 of FIGS. 4A and 4C can be captured by the camera 210 of the vehicle 200, and the corresponding point cloud maps 404, 408 of FIGS. 4B and 4D can be captured by the LIDAR sensor 206. As shown in the examples of FIGS. 4B and 4D, a laser point cloud image may substantially or approximately correspond to a raw camera image captured by a camera. Moreover, FIGS. 4B and 4D show that LIDAR-indicated point cloud maps for the distinct environmental scenes 402, 406 (i.e., the images in FIGS. 4A and 4C) result in distinct point maps 404, 408 which correspond to their respective scenes. For clarity it is noted that each "line" depicted in FIGS. 4B and 4D generally corresponds to a series of spatial points collected by a particular, single, laser of LIDAR 206.

FIGS. 5A-5B, 7A-7G, 8 and 10 each present flowcharts describing processes employed separately or in combination in some embodiments of the present disclosure. The methods and processes described herein are generally described by way of example as being carried out by an autonomous vehicle, such as the autonomous vehicles 100, 200 described above in connection with FIGS. 1 and 2. For example, the processes described herein can be carried out by a LIDAR sensor 128 and associated optical sensors (e.g., the sensors 202 on vehicle 200) mounted to an autonomous vehicle (e.g., the vehicle 200) in communication with a computer system 112, sensor fusion algorithm module 138, and/or computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart 500. Where used, program code can be stored on any type of computer readable medium (e.g., computer readable storage medium or non-transitory media, such as data storage 114 described above with respect to computer system 112), for example, such as a storage device including a disk or hard drive. In addition, each block of the flowchart 500 can represent circuitry that is wired to perform the specific logical functions in the process. Unless specifically indicated, functions in the flowchart 500 can be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure, such as the additional flowcharts shown in FIGS. 5A-5B, 7A-7G, 8, and 10.

For purposes of context, example, and explanation, an overview of general approaches to object detection is provided below in connection with an example LIDAR device. As noted above, example vehicle 100 includes a LIDAR device 128. LIDAR 128 actively captures laser point cloud images using one or more lasers. The laser point cloud includes many points for each pulse emitted from the LIDAR device 128: reflected signals indicate actual locations of reflective objects, whereas failing to receive reflected signals indicate an absence of sufficiently reflective objects within a particular distance along the line of sight of the laser. Depending on factors including the laser pulse rate, the scene refresh rate, the total solid angle sampled by each LIDAR device (or just the total solid angle of the scene, where only one LIDAR device is used), the number of sample points in each point cloud can be determined. Some embodiments can provide point clouds with as many as 50,000 laser-indicated points, 80,000 laser-indicated points, 100,000 laser-indicated points, etc. Generally, the number of laser-indicated points in each point cloud is a tradeoff between angular resolution on the one hand, and refresh rate on the other hand. The LIDAR device is driven to provide an angular resolution at a sufficiently high refresh rate to be relevant to real time navigational decisions for an autonomous vehicle. Thus, the LIDAR 128 can be configured to capture one or more laser point clouds of the environmental scene at predetermined time intervals, such as 100 milliseconds (for a refresh rate of 10 frames per second), 33 milliseconds (for a refresh rate of 30 frames per second), 1 millisecond, 1 second, etc.

Data storage 114 of computer system 112 of vehicle 100 can store object-detector software, code, or other program instructions. Such object-detector software can include, or be part of, one or more of the control systems 106 described above, including the sensor fusion algorithm 138, computer vision system 140, and/or obstacle avoidance system 144. The object detector may be any configuration of software and/or hardware configured to perceive features in the environmental scene by categorizing and/or identifying objects based on the laser point clouds captured by the LIDAR 128 and/or based on one or more of the sensors in sensor system 104. As a laser point cloud is captured via LIDAR 128, data indicative of the captured point cloud is communicated to the object detector, which analyzes the data to determine whether there is an object present in the laser point cloud. Objects indicated by the point cloud may be, for example, a vehicle, a pedestrian, a road sign, a traffic light, a traffic cone, etc.

To determine whether an object is present in a laser point cloud image, the object detector software and/or module can associate arrangements of laser-indicated points with patterns matching objects, environmental features, and/or categories of objects or features. The object detector can be pre-loaded (or dynamically instructed) to associate arrangements according to one or more parameters corresponding to physical objects/features in the environment surrounding the vehicle 100. For example, the object detector can be pre-loaded with information indicating a typical height of a pedestrian, a length of a typical automobile, confidence thresholds for classifying suspected objects, etc.

When the object detector identifies an object in point cloud, the object detector can define a bounding box encompassing the object that. For example, the bounding box can correspond to a predicted exterior surface of the point cloud indicated object. Of course, the bounding "box" can generally take the form of a multi-sided closed shape defining the predicted outer boundaries of the object.

For each captured point cloud, positions of perceived objects and their corresponding boundary definitions are associated with a frame number or frame time. Thus, similarly shaped objects appearing in roughly similar locations in successive scans of the scene can be associated with one another to track objects in time. For perceived objects appearing in multiple point cloud frames (e.g., complete scans of the scanning zone), the object can be associated, for each frame on which the object appears, with a distinct bounding shape defining the dimensional extent of the perceived object.

Perceived objects can be tracked as the vehicle 100 travels through its surrounding environment and/or as objects move with respect to the vehicle so as to pass through the scanning zone of the LIDAR 128. Combining two or more successively captured point clouds can thereby allow for determining translation information for detected objects. Future position predictions can be made for objects with characterized motion profiles, such as by observing acceleration and/or velocity of objects such as cars moving along the roadway with the vehicle 100 to predict the location of the object during a subsequent scan. In some embodiments, objects moving through the air are assumed to move along a trajectory influenced by the force of gravity.

To assist in providing object recognition, the vehicle 100 can also be in communication with an object-identification server (e.g., via the wireless communication system 146).

The object-identification server can verify and/or classify objects detected by vehicle 100 using the object detector. Moreover, the object-identification server can facilitate optimization of one or more of the parameters used by the object detector to detect objects in the captured laser point cloud based on accumulated data from other similar systems, local conditions. In one embodiment, vehicle 100 can communicate the object boundaries, and their corresponding object parameters, to the object identification server for verification that the perceived objects are correctly identified, such as indicated by an evaluation for statistical likelihood of correct identification.

In some embodiments, a single laser in the LIDAR device (e.g., the LIDAR device 302 discussed in connection with FIGS. 3A-3C) can have a scanning range of approximately 150 meters distance, a thirty degree vertical ("altitude") field of view, and approximately a thirty degree horizontal ("azimuth") field of view. Additional lasers included in the LIDAR device can have complementary ranges and fields of view as well so as to provide sufficient coverage of an environmental scene to inform navigational determinations.

Figure 5A:
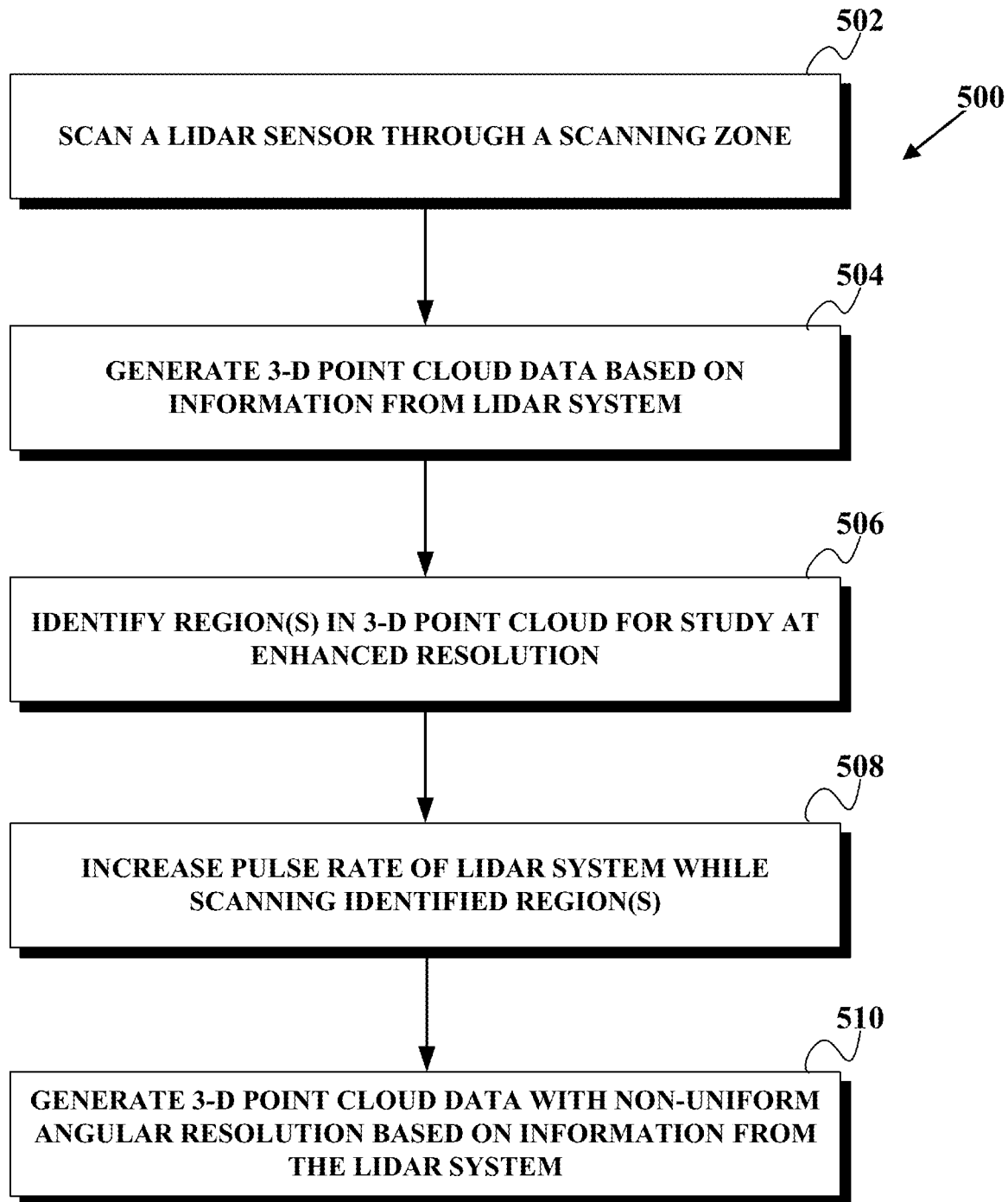
FIG. 5A is a flowchart of a process for adaptively adjusting an angular resolution of a LIDAR device by adjusting a pulse rate of the LIDAR device.

FIG. 5A is a flowchart 500 of a process for adaptively adjusting an angular resolution of a LIDAR device by adjusting a pulse rate of the LIDAR device. A LIDAR sensor is scanned through a scanning zone (502). In some embodiments, a LIDAR sensor can be similar to the LIDAR device 302 described in connection with FIGS. 3A-3C and can be scanned through a scanning zone by manipulating beam steering optics (e.g., the rotating angled mirror 304) to direct a pulsing laser to sweep across a scene. The scanning zone scanned by the LIDAR sensor is then the complete scene scanned by the pulsing laser. Of course, as described above, scanning the scanning zone can be carried out by multiple individual LIDAR devices each scanning respective sections of the entire scanning zone, and which sections can optionally be partially overlapping.

During and/or following the scan of the scanning zone (502), data from the LIDAR sensor is analyzed to generate a three-dimensional ("3-D") point cloud of positions of detected reflective points defining reflective features in the environment surrounding the vehicle. For example, data from the LIDAR sensor can include correlated lists of orientation of the LIDAR device (e.g., altitude and azimuth angles), to indicate direction to each point, and time delay between emission and reception, to indicate distance to each point.

The generated point cloud is analyzed to identify region(s) of the environment surrounding the vehicle for study at enhanced angular resolution (506). Example techniques for identifying the region(s) for enhanced resolution study are discussed further below in connection with the flowcharts in FIGS. 7A-7G The region(s) can be identified by an automated process configured to receive point cloud data, analyze one or more frames of point cloud data, and identify regions of the environment indicated by the point cloud data that warrant examination at enhanced angular resolution. Such an automated process can be implemented via hardware modules and/or software components executed via the computer system 112 and processor 114 to provide functions such as pattern recognition, object detection, etc. to analyze the 3-D point clouds.

While scanning the identified region(s), the LIDAR sensor is driven with an increased pulse rate (508) so as to increase the density of sample points in the identified region(s) and thereby increase the local angular resolution of the point cloud. For example, with reference to the LIDAR device 302, the rate of angular sweeping provided by the beam steering optics 304 can be maintained at a constant rate while the pulse rate of the laser source is increased such that the time delay between successively emitted pulses, and similarly the amount of angular change provided by the beam steering optics between successively emitted pulses, is decreased. Temporarily increasing the laser pulse rate while scanning the identified region(s) thus provides enhanced angular resolution, with respect to the LIDAR device, in those identified region(s).

Another 3-D point cloud is generated from the LIDAR-sampled data (510). The point cloud generated in block 510 generally has greater angular resolution in the identified region(s), where the pulse rate was increased, than in other regions of the scanning zone such that the resulting 3-D point cloud has a non-uniform angular resolution (e.g., a non-uniform angular separation between adjacent points), with respect to the position of the LIDAR device. The non-uniform 3-D point cloud generated in block 510 can then be further analyzed by the hardware modules and/or software components, such as the obstacle avoidance systems 144, computer vision systems 140, sensor fusion algorithm 138, object detection systems, etc. to inform autonomous decision-making by the vehicle 100 based on the indications of the surrounding environment provided by the non-uniform 3-D point cloud.

Figure 5B:
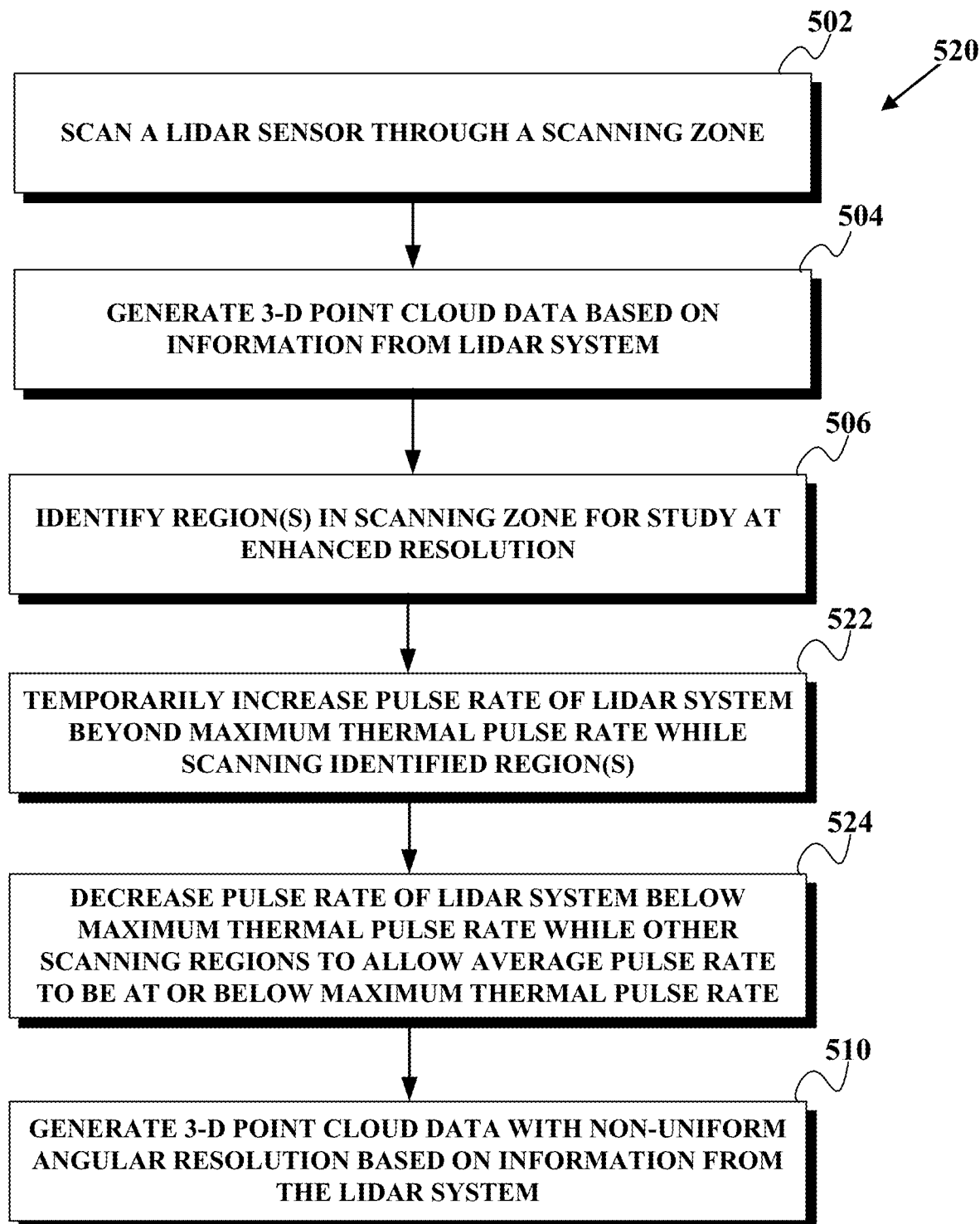
FIG. 5B is a flowchart of a process for driving a LIDAR device at a pulse rate exceeding a maximum sustained pulse rate for thermally stable operation.

FIG. 5B is a flowchart 520 of a process for driving a LIDAR device at a pulse rate temporarily exceeding a maximum sustained thermally stable pulse rate. In example embodiments, a scanning LIDAR (e.g., the LIDAR device 302 described in connection with FIGS. 3A-3C) can have a maximum sustained pulse rate set by thermal characteristics of the LIDAR device lasing media, associated optics, and/or heat sinks, etc. as well as ambient conditions. For example, continuously operating the LIDAR device with a particular pulse rate results in a steady-state temperature, where the rate of heat energy generation approximately equals the rate of heat dissipation. In general, the pulse intensity (e.g., laser brightness) and/or duty cycle (e.g., length of pulse duration as compared to interval between successive pulses) can also influence the steady state temperature, however, the intensity is set according to the desired distance sensitivity of the LIDAR device, and the duration is set to be as short as practicable so as to maximize the temporal sensitivity of the time delay measurement. Thus, the pulse rate of the LIDAR device in continuation operation is desirably selected to avoid undesirable thermally-driven effects in the output signal, such as intensity variations in the laser output, spontaneous optical noise, etc. and/or excessive degradation in the operating lifetime of the device, such as due to sustained operating temperatures above a threshold level, etc.

Some embodiments of the present disclosure allow for temporarily increasing the pulse rate from a default rate to exceed the maximum sustained pulse rate. To mitigate the thermal limits in the behavior of the device, exceeding the maximum sustained pulse rate is followed by a period of decreased pulse rate to allow the LIDAR device to thermally stabilize before returning to the default pulse rate. In some examples, the period of decreased pulse rate can optionally immediately follow operating in excess of the maximum sustained pulse rate. The default pulse rate can optionally be substantially similar to the maximum sustained pulse rate. Furthermore, some embodiments of the present disclosure allow for temporarily driving a LIDAR device at a rate exceeding a maximum sustained pulse rate when preceded by a period of decreased pulse rate to allow the LIDAR device to cool prior to exceeding the maximum sustained pulse rate. In some embodiments, the total duration of the temporary increase in the pulse rate is less than a characteristic thermal rise time of the LIDAR device itself.

The scanning LIDAR may be operated at a first pulse rate, such as a default pulse rate, that is within its pulse-rate limit so as to generate in real time a 3-D point cloud with a substantially uniform angular resolution based on the first pulse rate (502, 504). Concurrently with generation of the 3-D point map and in real time, a processor-based perception system identifies region(s) for enhanced resolution examination (506). The pulse rate of the LIDAR device is temporarily increased beyond its maximum sustained pulse rate while the LIDAR device scans the identified region(s) (522). The pulse rate is decreased to allow the LIDAR device to thermally regulate (524). In some embodiments, the decreased pulse rate in block 524 is below the first pulse rate (e.g., default pulse rate) and is maintained for a period long enough to allow the time-averaged pulse rate to be at or below the maximum sustained pulse rate. In some embodiments, the default pulse rate itself is sufficiently below the maximum sustained pulse rate such that operating at the default pulse rate allows the LIDAR device to sufficiently thermally stabilizes following operation at the excess pulse rate.

A mixed-resolution 3-D point cloud is generated from the LIDAR-sampled data points, with the high angular resolution regions sampled while the LIDAR device is driven in excess of its maximum sustained pulse rate, and default resolution, and/or low resolution regions sampled while the LIDAR device is driven at its default pulse rate, or low rate, respectively.

Figure 6B:
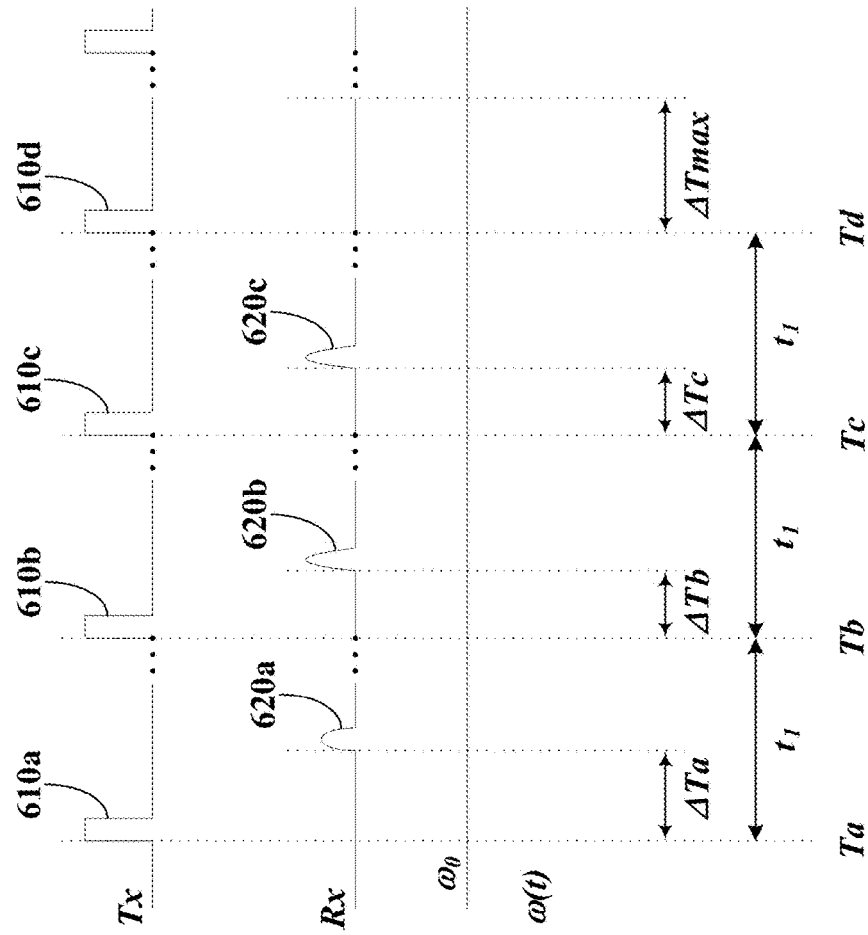
FIG. 6B is a timing diagram of the transmitted and received pulses for the exaggerated symbolic illustration of FIG. 6A.
Figure 6A:
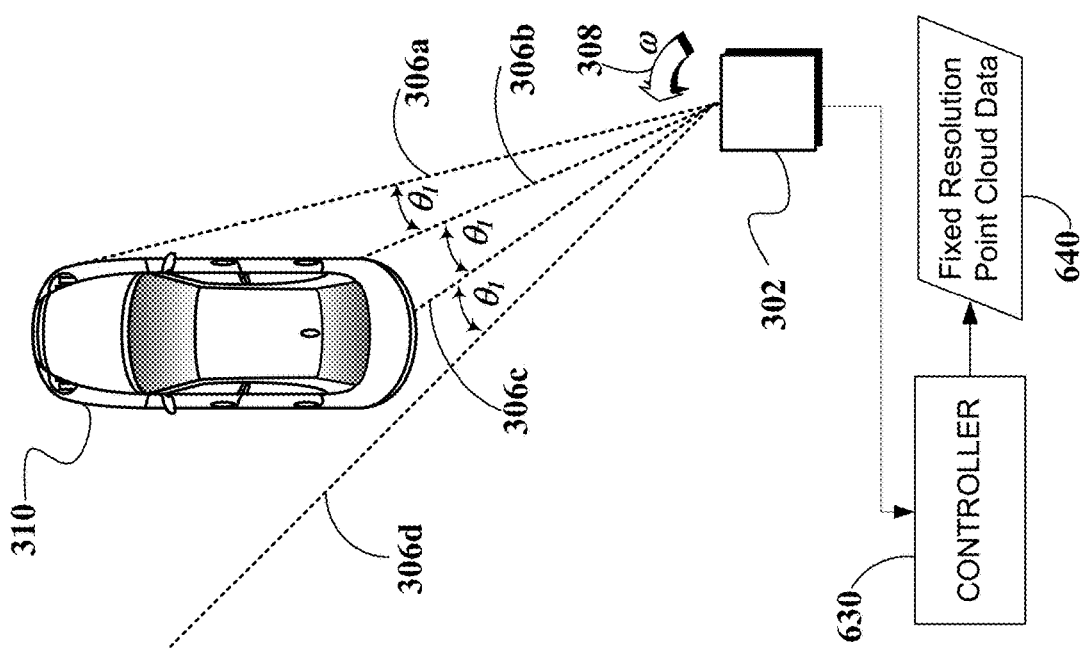
FIG. 6A symbolically illustrates a LIDAR device scanning across an example obstacle-filled environmental scene with constant time delays between successive measurement points where the time delays are exaggerated for illustrative purposes.

FIG. 6A symbolically illustrates a LIDAR device 302 scanning across an example obstacle-filled environmental scene with constant time delays (e.g., the delay time t1) between successive measurement points where the time delays are exaggerated for illustrative purposes. The LIDAR device 302 scans the laser beam 306 across the environmental scene via its beam steering optics 304 while its laser light source pulses, such that successive pulses are emitted with an angular separation $\theta_1$, which is approximately given by the product of w and where w is the angular sweeping rate of the LIDAR device (e.g., the angular rotation rate of the beam steering optics 304), and $t_1$ is the time period between successive pulse emissions. As a result of the rotation of the beam steering optics in the LIDAR device 302, temporally separated pulses (e.g., pulses emitted at times separated by the time $t_1$) are directed in respective angular orientations separated by the amount of rotation of the beam steering optics during the interval $t_1$ (e.g., the angle $\theta_1$). The time scale of the interval between successive pulses, and the corresponding resulting angular separations, is intentionally exaggerated in FIG. 6A for illustrative purposes. A controller 630 is arranged to receive signals from the LIDAR device 302 and/or associated optical sensors to generate point cloud data 640 indicative of the 3-D positions of reflective features in the environmental scene surrounding the LIDAR device 302.

FIG. 6B is a timing diagram of the transmitted and received pulses for the exaggerated symbolic illustration of FIG. 6A. The timing diagram symbolically illustrates the transmitted pulses (labeled on FIG. 6B as "Tx"), the received pulses (labeled on FIG. 6B as "Rx"), and the angular sweeping rate of the LIDAR device 302 (labeled on FIG. 6B as ω(t)).

An example operation of the LIDAR device 302 to achieve substantially uniform angular resolution is described in connection with FIGS. 6A and 6B. At time Ta, a first pulse 610a is emitted from the LIDAR device 302 and directed along laser beam path 306a via the beam steering optics. As shown in FIG. 6A, the beam path 306a is reflected from near the front passenger-side region of the car 310, and a first reflected signal 620a is detected at optical signals associated with the LIDAR device 302 (e.g., via optical sensors included in the sensor system 202 mounted on the vehicle 200 in FIG. 2). The time delay between the emission of pulse 610a and reception of the reflected signal 620a is indicated by time delay ΔTa. The time delay ΔTa and the orientation of the LIDAR device 302 at time Ta, i.e., the direction of laser beam 306a, are combined in the controller 630 to map the 3-D position of the reflective point on the front passenger-side region of the car 310.

Next, at time Tb, which a second pulse 610b is emitted from the LIDAR device 302 and directed along laser beam path 306b. Time Tb is temporally separated from time Ta by the interval time t1, and the direction of the laser beam path 306b is thus angularly separated from the direction of laser beam path 306a by angular separation $\theta_1$, due to the change in orientation of the beam steering optics in the LIDAR device during the interval $t_1$. Where the beam steering optics are undergoing a constant angular sweeping with an angular rate of change $\omega_0$, the angle of separation $\theta_1$ between the laser beams 306a and 306b is at least approximately given by the product of $\omega_0$ and $t_1$. The laser pulse 310b is reflected from near the rear passenger-side region of the car 310, and a second reflected signal 620b is detected with a relative time delay ΔTb from the emission of the second pulse 610b. As illustrated in FIG. 6B, the LIDAR device 302 is generally situated behind the car 310, and so the reflective point near the rear passenger-side region of the car 310 (responsible for the reflected signal 620b) is closer to the LIDAR device 302 than the reflective point near the front passenger-side region of the car 310 (responsible for the reflected signal 620a). As a result, the relative time delay ΔTb is shorter than the relative time delay ΔTa, corresponding to the difference in roundtrip travel time at the speed of light between the LIDAR device 302, and the respective reflective points at the front and rear of the car.

Further, the sensors detecting the reflected signals can optionally be sensitive to the intensity of the reflected signals. For example, the intensity of the reflected signal 620b can be perceptibly greater than the intensity of the reflected signal 620a, as shown symbolically in FIG. 6B. The controller 630 maps the 3-D position of the reflective point near the rear passenger-side of the car 310 according to the time delay value ΔTb and the orientation of the LIDAR device 310 at time Tb, i.e., the direction of laser beam 306b. The intensity of the reflected signal can also indicate the reflectance of the reflective point, in combination with the distance to the point as indicated by the measured time delay. The reflectance of the reflective point can be employed by software and/or hardware implemented modules in the controller 630 to characterize the reflective features in the environment. For example, traffic indicators such as lane markers, traffic signs, traffic signals, navigational signage, etc., can be indicated in part based on having a relatively high reflectance value, such as associated with a reflective coating applied to traffic and/or navigational signage. In some embodiments, identifying a relatively high reflectance feature can provide a prompt to undertake a further scan of the high reflectance feature with one or more sensors, such as those in the sensing system 104. Thus, in one example, a reflected signal indicating a high reflectance feature can provide a prompt to image the high reflectance feature with a camera to allow for identifying the high reflectance feature. In some embodiments where the high reflectance feature is a traffic sign, the camera image can allow for reading the sign via character recognition and/or pattern matching, etc. and then optionally adjusting navigational instructions based on the sign (e.g., a sign indicating a construction zone, pedestrian crosswalk, school zone, etc. can prompt the autonomous vehicle to reduce speed).

At time Tc, following the time Tb by the interval t1, a third pulse 610c is emitted from the LIDAR device 302. The third pulse 610c is directed along a laser beam path 306c, which is approximately angularly separated from the beam path 306b by the angle $\theta_1$. The pulse 610c is reflected from a point near the middle of the rear bumper region of the car 310, and a resulting reflected signal 620c is detected at the LIDAR device 302 (or its associated optical sensors). The controller 630 combines the relative time delay ΔTc between the emission of pulse 610c and reception of reflected signal 620c and the orientation of the LIDAR device 302 at time Tc, i.e., the direction of beam path 306c, to map the 3-D position of the reflective point.

At time Td, following time Tc by the interval $t_1$, a fourth pulse 610d is emitted from the LIDAR device 302. The fourth pulse 610d is directed along a laser beam path 306d, which is approximately angularly separated from the beam path 306c by the angle $\theta_1$. The beam path 306d entirely avoids the car 310, and all other reflective environmental features within a maximum distance sensitivity of the LIDAR device 302. As discussed above, the maximum distance sensitivity of the LIDAR device 302 is determined by the sensitivity of the associated optical sensors for detecting reflected signals. The maximum relative time delay ΔTmax corresponds to the maximum distance sensitivity of the LIDAR device (i.e., the time for light signals to make a round trip of the maximum distance). Thus, when the optical sensor associated with the LIDAR device 302 does not receive a reflected signal in the period ΔTmax following time Td, the controller 630 determines that no reflective features are present in the surrounding environment along the laser beam path 306d.

The reflective points on the car 310 corresponding to the reflected signals 610a-c form a subset of points included in a 3-D point cloud map of the environment surrounding the LIDAR device 302. In addition, the direction of the laser beam 310d is noted in the 3-D point cloud map 640 as being absent of reflective features along the line of sight within the maximum distance sensitivity of the LIDAR device 302, because no reflected signal was received after the duration ΔTmax following the emission of pulse 610d at time Td. The points corresponding to laser beam directions 306a-d are combined with points spaced throughout the scanning zone (e.g., the region scanned by the LIDAR device 302), to create a complete 3-D point cloud map, and the results are output as fixed resolution point cloud data 640 for further analysis by object detection systems, pattern recognition systems, computer vision systems, etc. As described above, the points in the generated point cloud are separated by a substantially constant angular separation $\theta_1$ with respect to the LIDAR device 302 due to the substantially constant angular sweeping rate $\omega_0$ and the regular pulse rate of the LIDAR device 302 with interval timing $t_1$.

Figures 6C, 6D:
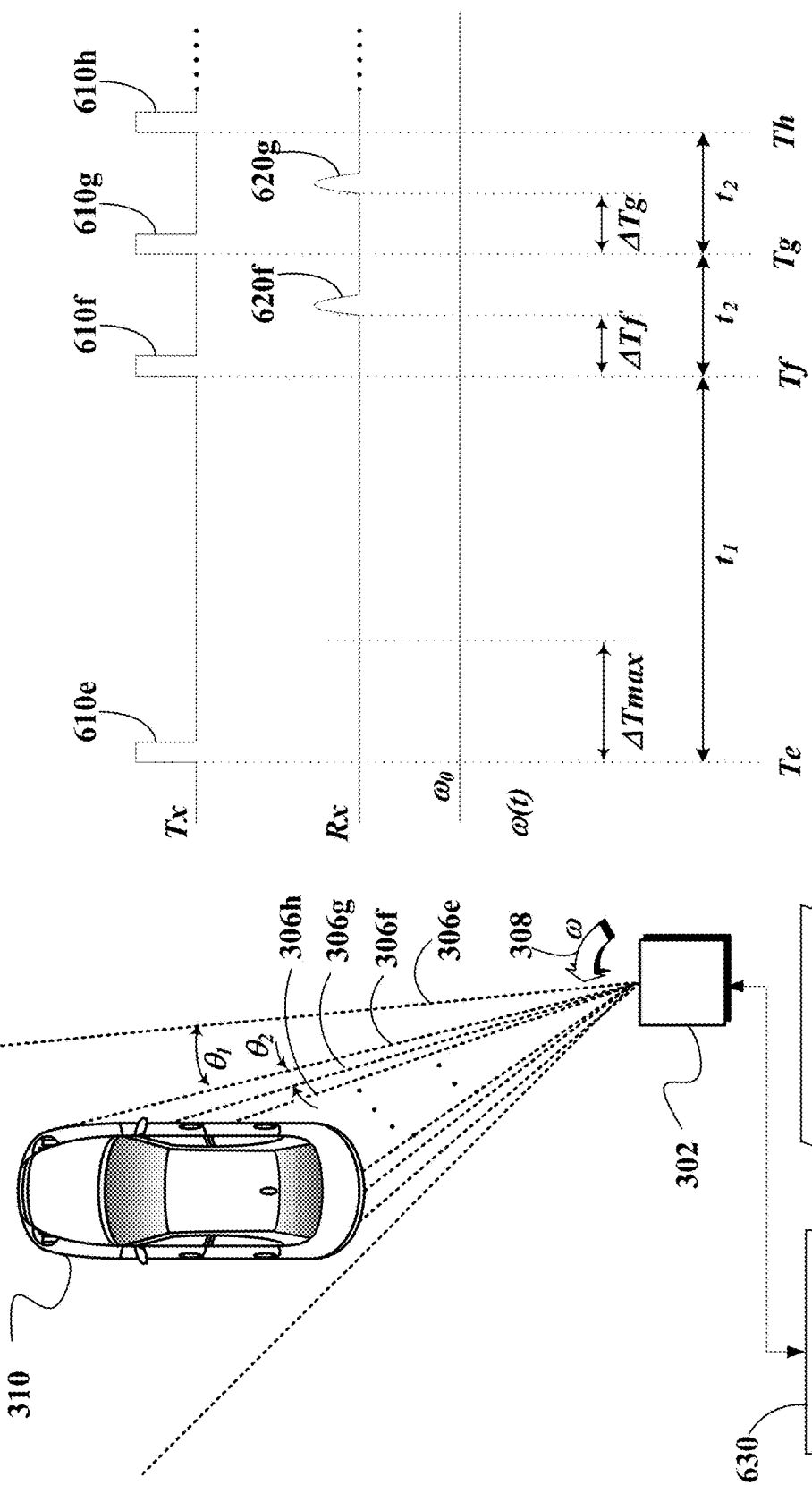
FIG. 6C symbolically illustrates a LIDAR device scanning across the example obstacle-filled environmental scene shown with adaptively adjusted time delays between successive measurement points to provide enhanced angular resolution in the vicinity of the environmental obstacle where the time delays are exaggerated for illustrative purposes.
FIG. 6D is a timing diagram of the transmitted and received pulses for the exaggerated symbolic illustration of FIG. 6C.

FIG. 6C symbolically illustrates the LIDAR device 302 scanning across the example obstacle-filled environmental scene shown with adaptively adjusted time delays between successive measurement points to provide enhanced angular resolution in the vicinity of the environmental obstacle where the time delays are exaggerated for illustrative purposes. The LIDAR device 302 is operated to scan through the surrounding scene with angular rate of change $\omega_0$, as in FIG. 6A. However, the pulse rate of the LIDAR device 302 is dynamically adjusted to vary from a pulse rate with intervals of approximately $t_1$ to intervals of approximately $t_2$, where $t_2$ is less than $t_1$. While operated at the high pulse rate (with intervals between successive pulse emissions of $t_2$, rather than $t_1$), the LIDAR device 302 provides angular separations between successive points of $\theta_2$, given approximately by the product of $\omega_0$ and $t_2$. Thus, the angular resolution of the resulting point cloud (e.g., as determined by the angular separation of adjacent points in the generated point cloud) is modified according to the interval spacing between subsequent pulses.

As shown in FIG. 6C, the pulse rate of the LIDAR device 302 is set to go high while the LIDAR device is directed toward the car 310. The determination to sample at high frequency while directed to the car 310 can optionally be determined, at least in part, based on analysis of one or more previous point clouds sampled with fixed angular resolution, such as described in connection with FIGS. 6A and 6B above. For example, the region of the environmental scene responsible for generating the reflected signals 620a-c can be selected for high resolution examination in a subsequent scan. Detailed discussions of techniques for identifying regions of an environmental scene for examination at enhanced ("increased") angular resolution are presented below in connection with FIGS. 7A-7G.

FIG. 6D is a timing diagram of the transmitted and received pulses for the exaggerated symbolic illustration of FIG. 6C. Similar to the timing diagram in FIG. 6B, the timing diagram symbolically illustrates the transmitted pulses (labeled on FIG. 6D as "Tx"), the received pulses (labeled on FIG. 6D as "Rx"), and the angular sweeping rate of the LIDAR device 302 (labeled on FIG. 6D as $\omega(t)$).

In an example operation of the LIDAR device 302 according to the timing diagram of FIG. 6D, a first pulse 610e is emitted from the LIDAR device 302 at time Te, and directed along laser beam 306e. No reflected signal is detected during the period $\Delta$Tmax following the time Te. An indication of an absence of reflective features within the maximum distance of sensitivity is noted by the controller 630 in connection with the orientation of the LIDAR device 302 at time Te (i.e., the direction of laser beam 306e).

At time Tf, following Te by the duration $t_1$, a second pulse 610f is emitted from the LIDAR device 302. The second pulse 610f is directed along a laser beam 306f, which is oriented with an angular separation $\theta_1$ from the laser beam 306e. The second pulse 610f reaches the front passenger-side region of the car 310 resulting in a reflected signal 620f. The reflected signal 620f is detected by the LIDAR device 302 and/or its associated optical sensors with a relative time delay of $\Delta$Tf following the emission at time Tf.

The pulse 610f marks the beginning of a temporary high pulse rate operation of the LIDAR device 302. The third pulse 610g is emitted at time Tg, which follows time Tf by an interval $t_2$, which interval is less than the interval $t_1$ between successive pulses while the LIDAR device 302 operates at its default pulse rate. The third pulse 610g is directed along laser beam path 306g, which has an orientation that differs from the direction of beam path 306f by the angle $\theta_2$. The angular separation $\theta_2$ between the two beam paths 306f and 306g is due, at least in part, to the angular rotation of beam steering optics in the LIDAR device 302 (e.g., the rotating angled mirror 304 of FIG. 3A) during the interval $t_2$. Thus, while the angular rate of change of orientation of the LIDAR device (such as via rotation of associated beam steering optics) is approximately constant at $\omega_0$, the angle $\theta_2$ is given approximately by the product of $\omega_0$ and $t_2$. The third pulse 610g is reflected from a point near the passenger-side door of the car 310, and a corresponding reflected signal 620g is detected by the LIDAR device 302 with relative time delay $\Delta$Tg.

The high rate scanning continues through the region including the vehicle 310, beginning with pulse 610h emitted along laser beam path 306h, such that the angular resolution of the generated point cloud for points on and/or near the vehicle 310 is generally greater than regions scanned with the default pulse rate. That is, angular separation between points on or near the car 310 is approximately $\theta_2$, while the angular separation of points in the point map located elsewhere is approximately $\theta_1$, and $\theta_2$ is less than $\theta_1$. In some embodiments, the high resolution ("high pulse rate") scanning can continue until a pulse (or series of repeated pulses) is emitted that does not result in a reflected response signal, which can be interpreted as scanning past a reflective feature of interest.

The controller 630 receives information from the LIDAR device 302 to generate a 3-D point cloud map indicating the locations of reflective features and/or the absence of reflective features within a maximum distance of sensitivity. The angular resolution of the distribution of points in the generated point cloud is non-uniform, with respect to the LIDAR device 302. In particular, some regions of the environment are sampled at a high pulse rate, and corresponding high angular resolution (e.g., the region including the car 310 sampled with pulses 306f-h, etc.), whereas other regions are sampled at the default pulse rate. As a result, some embodiments described herein describe the generated point cloud map as a mixed resolution point cloud. Data indicative of the positions of points in the point cloud map are output as mixed resolution point cloud data 642.

In some embodiments, the operation described in connection with FIGS. 6A and 6B to generate the fixed resolution point cloud data 640 can correspond to the blocks 502 and 504 of the flowchart 500 in FIG. 5A of the process for adaptively adjusting the pulse rate timing to generate a point cloud with non-uniform angular resolution. Similarly, in some embodiments, the operation described in connection with FIGS. 6C and 6D to generate the mixed resolution point cloud data 642 can correspond to the blocks 508 and 510 of the flowchart 500 in FIG. 5A. The processes for identifying regions of a LIDAR-indicated scene for enhanced resolution examination described below in connection with the flowcharts shown in FIGS. 7A-7G provide example processes for implementing block 506 of the flowchart 500 in FIG. 5A.

According to some embodiments of the present disclosure, a region of a LIDAR-indicated point cloud can be identified for enhanced angular resolution analysis based on a combination of factors. For example, enhanced angular resolution analysis can be initiated in response to identifying factors in one or more of the point cloud distance map provided by the LIDAR device, the intensity map of reflected light (e.g., from the LIDAR-received reflected light signals), an estimate of the location of the autonomous vehicle and/or pre-mapped objects of interest, an output from additional sensors such as the camera 210, etc. The estimated location of the autonomous vehicle and/or objects of interest can be based on comparing the dynamically generated 3-D point map with a baseline map of the scanning zone showing fixed objects of interests (e.g., lane markers, intersection locations, etc.).

Figure 7A:
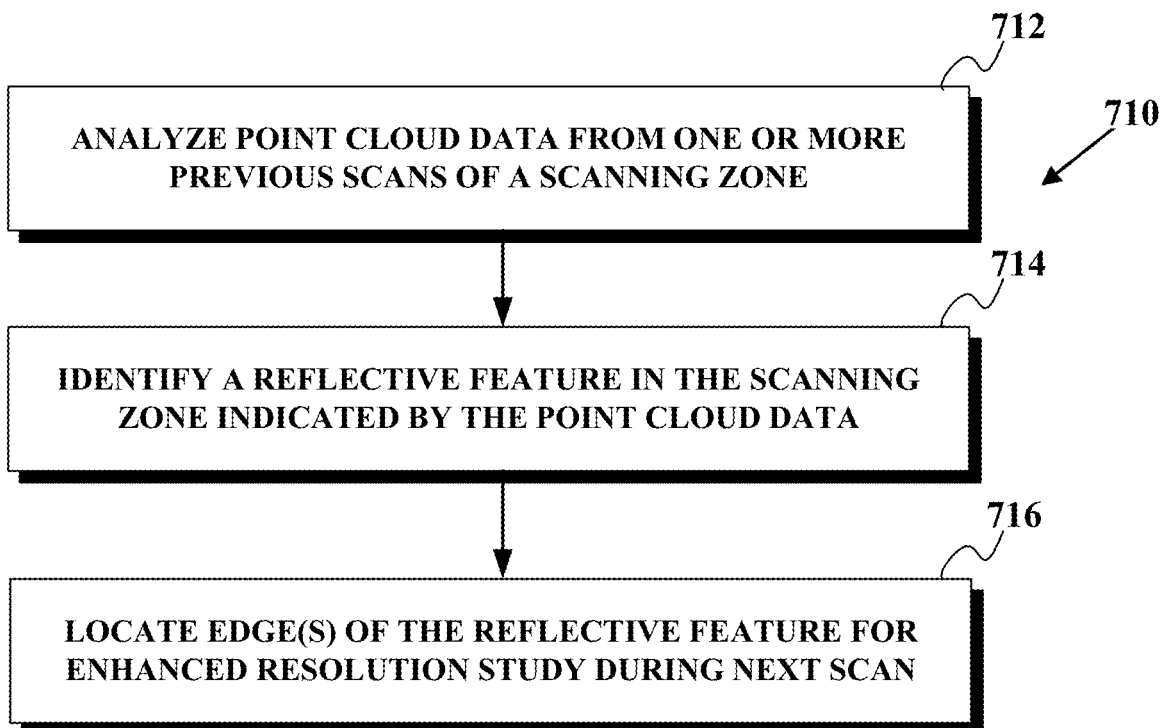
FIG. 7A is a flowchart of a process for identifying regions of a LIDAR-indicated point cloud to examine with enhanced angular resolution by detecting edge(s).

FIG. 7A is a flowchart 710 of a process for identifying regions of a LIDAR-indicated point cloud to examine with enhanced angular resolution by detecting edge(s). One or more point clouds from previous scans of a scanning zone are analyzed (712). In some embodiments, the analysis can be carried out via hardware and/or software components, such as the computer system 112 and associated processor 114, the computer vision system 140, and/or sensor fusion algorithm module 138 referred to in FIG. 1 in connection with the vehicle 100. An object detection module and/or software module identifies a reflective feature in the scanning zone indicated by the point cloud data (714). Once identified, the locations of the edge or edges of the feature are set as the regions to scan with enhanced angular resolution during the next scan (716). Locating edge(s) (716) can include estimating the dimensional extent of identified objects as indicated point cloud groupings in one or more previous scans of the environmental scene, which previous scans can be entirely default angular resolution scans and/or mixed resolution scans.

In some examples, edge locations can be estimated (716) according to detected discontinuities in distance measurements for adjacent or nearby points in the generated point cloud. That is, in some examples a cluster ("group") of points in a point cloud approximately define a surface associated with an environmental physical object or fixed feature. Hardware and/or software implemented object detection and/or recognition modules can associate the cluster of points with environmental objects/features. In such an example, the surface defined by the point cluster is surrounded, at least partially, by points that are not part of a continuous surface including the point cluster. Thus, the edges of viewable portions of perceived objects can be indicated by a sudden increase in line-of-sight distance where a relatively distant background is visible along a line of sight from the LIDAR device 302 immediately adjacent the perceived object. Additionally or alternatively, the edges of viewable portions of some objects can be indicated by a sudden decrease in line-of-sight distance where a closer object interferes with viewing the entire object.

In some examples, edge locations are estimated (716) according to predicted object dimensions, as indicated by standard libraries of, for example, car dimensions, pedestrian heights, etc. objects are locate edges of detected objects or features indicated by the generated point cloud data (714). The location of the edges in the environmental scene can then be based on predicted locations of edge(s) of perceived objects, as informed by standard dimension libraries, even where the perception and/or identification of a particular object is based on only a portion of the object.

Figure 7B:
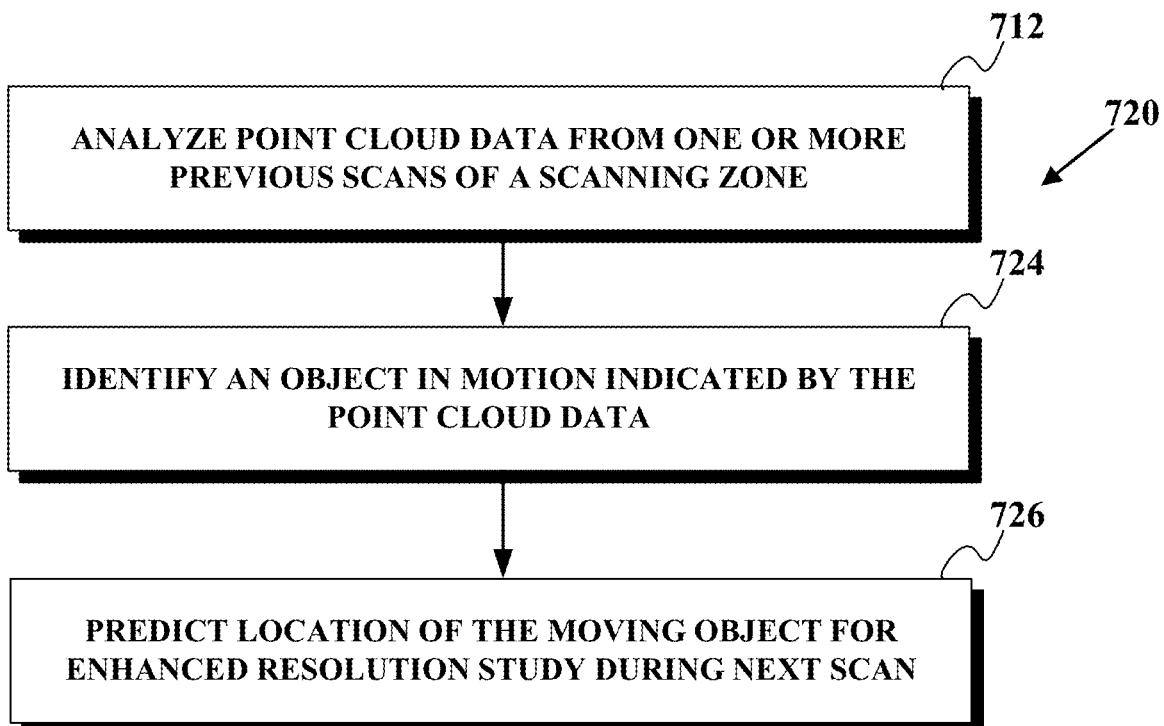
FIG. 7B is a flowchart of another process for identifying regions of a LIDAR-indicated point cloud to examine with enhanced angular resolution by detecting moving objects.

FIG. 7B is a flowchart of another process for identifying regions of a LIDAR-indicated point cloud to examine with enhanced angular resolution by detecting moving objects. One or more previous scans of a scanning zone are analyzed (712). As discussed above in connection with the hardware and/or software implemented object detection and/or object tracking functions, perceived objects in each generated point cloud are associated with a boundary approximately defining a shape of the perceived objects. Objects appearing in more than one frame of a time series of generated point clouds are associated with one another based on similar point cloud shapes and/or absolute relative positions from one frame to the next. Thus, the same object can be identified and position mapped at a series of time points so as to determine a motion profile of the object. Thus, an object in motion can be identified from the point cloud data (724). Moreover, moving objects can be distinguished from non-moving objects. The locations of such moving objects during the next scan can be predicted, and the predicted location can be set as the region for enhanced resolution study (726).

In some instances, the region set for enhanced resolution study during block 726 includes a characteristic uncertainty in the future position of the moving object. The region for enhanced resolution study can therefore be larger than the predicted size of the moving object as determined by the point cloud data. For example, the region for enhanced study can include the predicted location of the moving object during the next scan, and can be enlarged, relative to the size of the moving object, according to the uncertainty of the predicted location. The uncertainty can be formulaic, such as based on the expected size of the moving object, or a standard angular separation surrounding the position of the moving object. Additionally or alternatively, the uncertainty can be based on empirical factors and/or measurement uncertainty in the position and/or motion profile of the moving object, for example.

For example, the car 310 described in connection with FIG. 6C can be in motion with respect to the LIDAR device 302. That is, the relative position of the car 310 with respect to the LIDAR device 302 can vary between a first scan (e.g., the fixed resolution scan described in connection with FIGS. 6A and 6B) and a second, high angular resolution scan. Thus, identifying the region of the environment to scan that includes the car 310 during the second scan includes predicting a future location of the car 310 based on a motion profile (e.g., speed and direction) for the car 310.

Some embodiments also allow for detecting and characterizing moving objects based on real time analysis of a single three-dimensional point cloud map. For example, due to time delays between measuring points in different regions of the scanning zone, there may be some detectable motion of perceived objects within a single frame. In some instances, the scanning zone is analogous to an arrangement of points distributed in azimuth and elevation, to form a grid-like structure, with each row having a common altitude orientation, and each column having a common azimuth orientation. Where a LIDAR device operates by rotating at a fixed altitude orientation to sample azimuthal variations before moving to the next altitude value, the relative time delay between scans at distinct altitude values can be comparable to the period for a complete scan. At sufficiently slow refresh rates (and/or for sufficiently rapidly moving objects) the "vertical" edges of objects (i.e., edges with approximately instantaneously constant azimuth) appear to be slanted, as successive altitude scans detect the moving object at slightly different locations. Thus, generation of a real-time 3-D point map can be used to detect and measure relative motion between the scanning LIDAR and a transient object in the scanning zone (724). By measuring relative motion, hardware and/or software elements of the perception system can also predict a trajectory of the moving object. The perception system also predicts the future location of the moving object, and thereby identifies the regions of the scanning zone for high resolution mapping as a function of time (726).

Some embodiments of the present disclosure include selectively scanning moving objects with high angular resolution so as to better characterize the position and/or motion profile of such objects. Establishing accurate positions of moving objects allows for precisely characterizing the motion profile of the object over time such that the location of the object can be predicted with greater accuracy than possible without enhanced angular resolution analysis. Thus, some embodiments of the present disclosure operate to selectively allocate scanning resources to resolving the positions and/or motion profiles of moving objects in the scanning zone so as to enable greater precision in future predicted locations of such objects, and thereby enable greater precision in object avoidance.

Moreover, the techniques for identifying locations to scan with high angular resolution described in connection with FIGS. 7A and 7B, can be combined together. For example, the region to scan with high angular resolution can be the predicted location of edge(s) of a moving object.

Figure 7C:
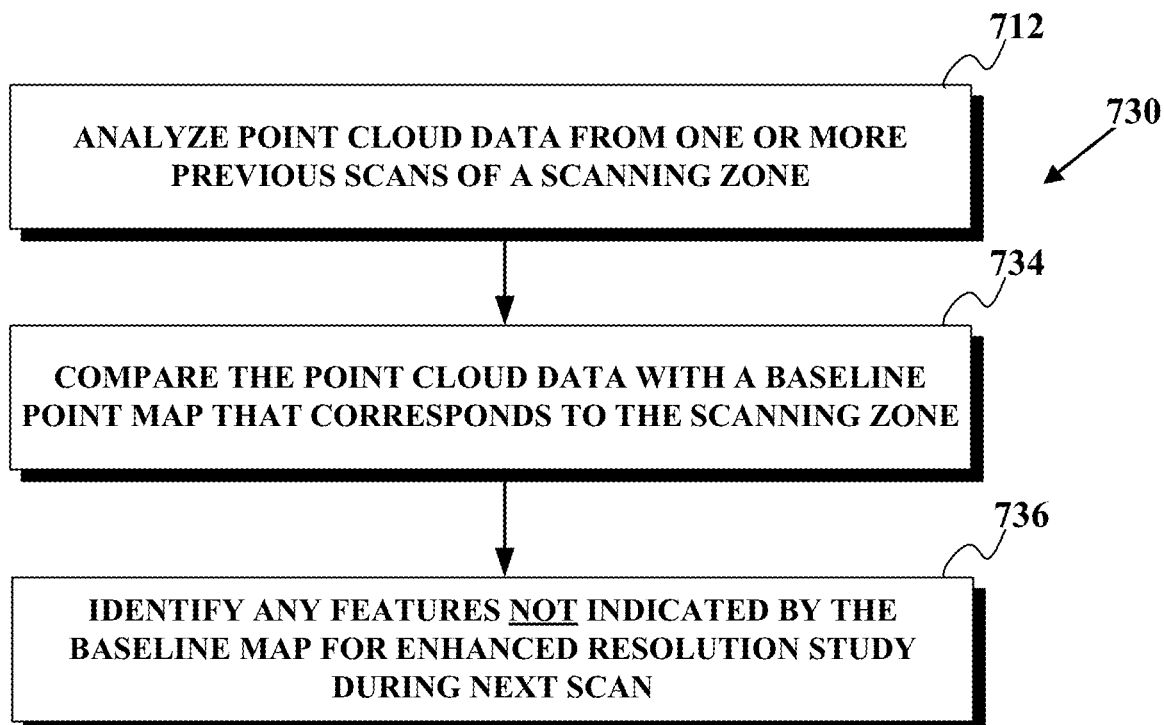
FIG. 7C is a flowchart of another process for identifying regions of a LIDAR-indicated point cloud to examine with enhanced angular resolution by comparison with a baseline point map

FIG. 7C is a flowchart of another process for identifying regions of a LIDAR-indicated point cloud to examine with enhanced angular resolution by comparison with a baseline point map. A baseline point map can be, for example, a three-dimensional map of fixed structures along a roadway that is generated in advance. Such a baseline map can indicate, for example, the approximate three-dimensional locations of curbs, trees, buildings, road signs, permanent barricades, and/or other substantially permanent objects and environmental features defining the surroundings of a roadway or other vehicular path of travel. In some examples, the baseline 3-D map is generated by a LIDAR device actively monitoring a scene while traversing the scene substantially in the absence of transient objects. Additionally or alternatively, the baseline 3-D map can be generated by combining multiple maps to distinguish fixed features from transient objects. Additionally or alternatively, the baseline 3-D point map can be generated via recognition/categorization software and/or hardware implemented modules that analyze one or more maps to selectively eliminate reflective features identified as corresponding to transient objects, such as reflective features identified as cars, pedestrians, etc. The baseline 3-D map can be loaded in digital form and stored locally in the data storage 114 of the computer system 112 and/or can be dynamically downloaded from an external server via the communication system 146.

One or more LIDAR-indicated point cloud maps of the scanning zone are analyzed via the hardware and/or software implemented data analysis modules to identify regions for high resolution study (712). Based on the approximate position of the scanning zone, which can be based on the sensing system 104, such as the GPS 122, a region of the baseline map is identified that corresponds to the scanning zone (e.g., a region of the baseline map at substantially the same geographic location as the scanning zone). The dynamically generated 3-D point cloud maps are compared with the corresponding region of the baseline map (734). The software and/or hardware implemented perception systems identify differences between the dynamically generated point cloud map(s) (736). Reflective features indicated in the dynamically generated point could map(s) that are not present in the baseline map are set for enhanced resolution scanning. That is, the region identified for enhanced resolution scanning in block 506 of FIG. 5A is set to include the locations of reflective features indicated by the real time point cloud scans, but not indicated by the baseline 3-D map. In some embodiments, reflective features indicated in the dynamically generated point cloud maps that are determined to also be present in the baseline map are identified as fixed features, whereas reflective features not present in the baseline map are identified as transient objects. Scanning such dynamically indicated, presumptively transient objects with enhanced angular resolution allows for greater accuracy in position and/or motion profile determinations and thereby allows for greater precision in obstacle avoidance.

In some embodiments, the baseline 3-D map is analyzed to identify initial regions for low-resolution scanning and/or high-resolution scanning. For example, regions of the baseline 3-D map that indicate the presence of an intersection, a traffic control signal, a railroad crossing, etc. can be prioritized for high resolution scanning at the expense of regions of the baseline 3-D map that indicate blue sky, a body of water, or another region associated with a low probability of causing an obstacle. Upon analyzing additional scans, the initial resolution can be dynamically varied according to differences with the baseline 3-D map, as described in connection with FIG. 7C, and/or according to any of the processes described in FIGS. 7A-7G.

Figure 7D:
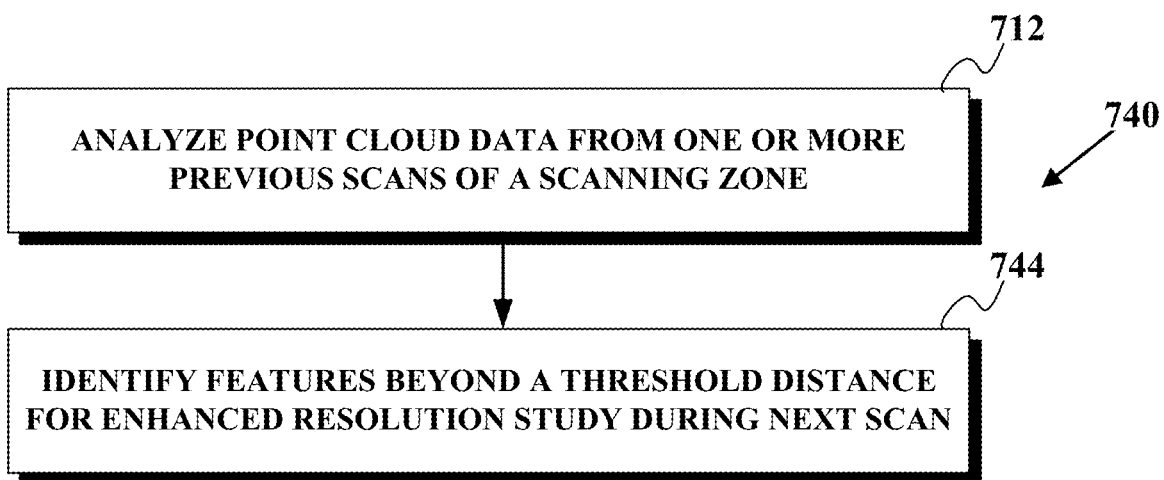
FIG. 7D is a flowchart of another process for identifying regions of a LIDAR-indicated point cloud to examine with enhanced angular resolution by detecting features beyond a threshold distance.

FIG. 7D is a flowchart 740 of another process for identifying regions of a LIDAR-indicated point cloud to examine with enhanced angular resolution by detecting features beyond a threshold distance. One or more LIDAR-indicated point cloud maps of the scanning zone are analyzed via the hardware and/or software implemented data analysis modules to identify regions for high resolution study (712). Perceived objects (e.g., clusters of points) located at a distance beyond a threshold distance are identified for enhanced resolution study (744). The identified region is then scanned with an enhanced angular resolution (e.g., by using an increased pulse rate) and an output mixed resolution point cloud is analyzed to better characterize the distant object.

The threshold distance can be set according to a desired spatial resolution to allow object identification/categorization with desired reliability. The spacing between adjacent points in the point cloud is given, at least approximately, by the arc length distance mapped by the angular change in the LIDAR orientation at the line of sight distance of the mapped features. Because arc length scales with radius (line of sight distance), the spatial resolution achieved by the LIDAR device is inversely proportionate to the line of sight distance to reflective features. Thus, distant objects can have relatively low spatial resolution which prevents accurate object identification/categorization. For example, in the case of an approaching car that first appears as a very small object on the horizon, scanning the distant car with enhanced angular resolution, allows the car to be identified and its position and motion to be characterized sooner than otherwise possible, which enables object avoidance and similar functions to be undertaken sooner.

In some instances, distant objects can optionally be identified for enhanced resolution study only when such distant objects are located within a zone including an anticipated direction of travel of the vehicle (e.g., within a zone defined by a cone with an apex at the vehicle and a base oriented toward a heading of the vehicle). For example, distant objects located directly to either side of a moving vehicle are not set for enhanced resolution study whereas distant objects located directly in front of the vehicle are set for enhanced resolution study. In some instances, distant objects are identified for enhanced resolution study only when such distant objects are located in a region of the environmental scene warranting further study, such as on another roadway. Regions of the scene warranting further study, such as roadways, etc., can be indicated by the sensor system 104, computer vision system 140, etc., based on lane lines, curbs, etc.

Figure 7E:
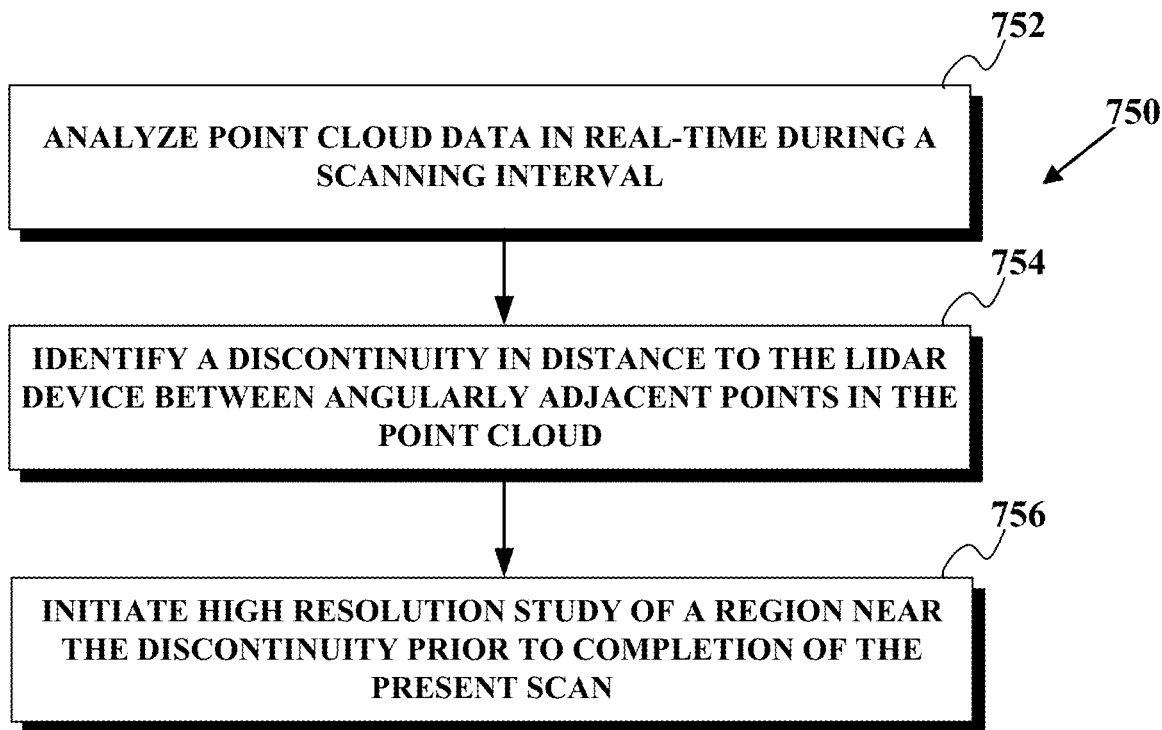
FIG. 7E is a flowchart of another process for identifying regions of a LIDAR-indicated point cloud to examine with enhanced angular resolution by detecting a discontinuity during a scan corresponding to an object edge.

FIG. 7E is a flowchart 750 of another process for identifying regions of a LIDAR-indicated point cloud to examine with enhanced angular resolution by detecting a discontinuity during a scan corresponding to an object edge. A dynamically generated point cloud is analyzed by hardware and/or software implemented data analysis modules (752). In particular, the technique demonstrated by block 752 analyzes data from a partial point cloud that is currently being sampled. Data from the current, partially complete point cloud is analyzed to identify local discontinuities in the distribution of point locations (754). For example, similar to the discussion of the technique for edge location described in connection with FIG. 5A, a cluster of points can be considered as being approximately located along a 3-D surface that defines an outer boundary of a reflective object with line of sight to the scanning LIDAR. The surface defining a single reflective object/feature generally bends and curves according to the shape of the object defined, and so is not necessarily planer. However, at the edges of such objects, the line of sight distances measured by the LIDAR device suddenly change from values roughly in the bounding surface to much further or closer distances, without an indication of any gradual bend or transition.

Such local discontinuities can be identified as an edge of an object. In response, the LIDAR device can be set to perform high angular resolution sampling so as to better define the edge of any such objects (756). In some embodiments, the high resolution study (756) can be initiated without involvement the object detection software and/or hardware modules to analyze a complete scan, identify objects in the scan, and then locate edges of those objects. The process illustrated by the flowchart 700 in FIG. 7E allows for rapid initiation of high resolution scanning to study indicated edges in a currently sampled scan, based on partially taken results from the same, current scan.

Figure 7F:
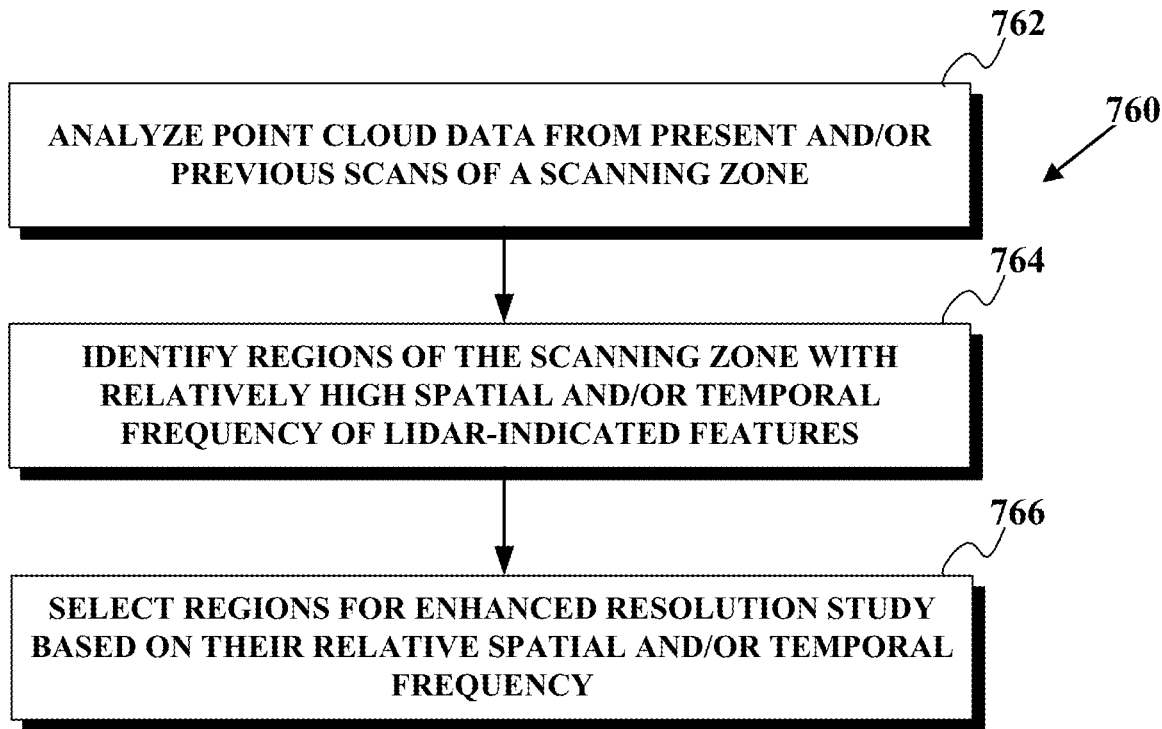
FIG. 7F is a flowchart of another process for identifying regions of a LIDAR-indicated point cloud to examine with enhanced angular resolution by identifying features arranged with high spatial or temporal frequency.

FIG. 7F is a flowchart 760 of another process for identifying regions of a LIDAR-indicated point cloud to examine with enhanced angular resolution by identifying features arranged with high spatial or temporal frequency. Hardware and/or software implemented data analysis modules analyze LIDAR-indicated point cloud data from present and/or previous scans of a scanning zone (762). Regions of the scanning zone with relatively high spatial and/or temporal frequencies of reflective features are located (764). Regions of the scanning zone are selected for enhanced resolution scanning based on the spatial and/or temporal frequency of the reflective features in those regions (766). For example, the regions with highest spatial and/or temporal frequency can be ranked and the regions with the highest rankings can be selected for enhanced resolution examination up to the available capacity of the LIDAR system for undergoing enhanced resolution study. In other examples, the regions selected for enhanced resolution study can preferentially select high temporal frequency regions (e.g., regions including moving objects) and select high spatial frequency regions (e.g., regions of the point cloud map including large distance variations, which can indicate object edges) subject to availability of resources, or vice versa. Furthermore, some embodiments include combinations of these approaches where an initially selected region is based on the spatial frequency of the selected region, but is only scanned with high angular resolution again, based on an observed change in the spatial frequency of the reflective features in the region.

In some aspects, the selection of high resolution scanning regions based on relative spatial and/or temporal frequency of the point cloud map can be considered a combination of techniques described in connection with the flowcharts 710, 720 of FIGS. 7A and 7B to select regions including edges or objects in motion. High spatial frequency regions of the scanning zone include regions with relatively large differences in distance measures between angularly nearby points, such as due to the discontinuity effects near the edges of perceived objects. High temporal frequency regions of the scanning zone include regions with points in the point cloud that vary between successively generated point cloud map frames, such as due to an object in motion that changes position between successive frames of the point cloud map.

Figure 7G:
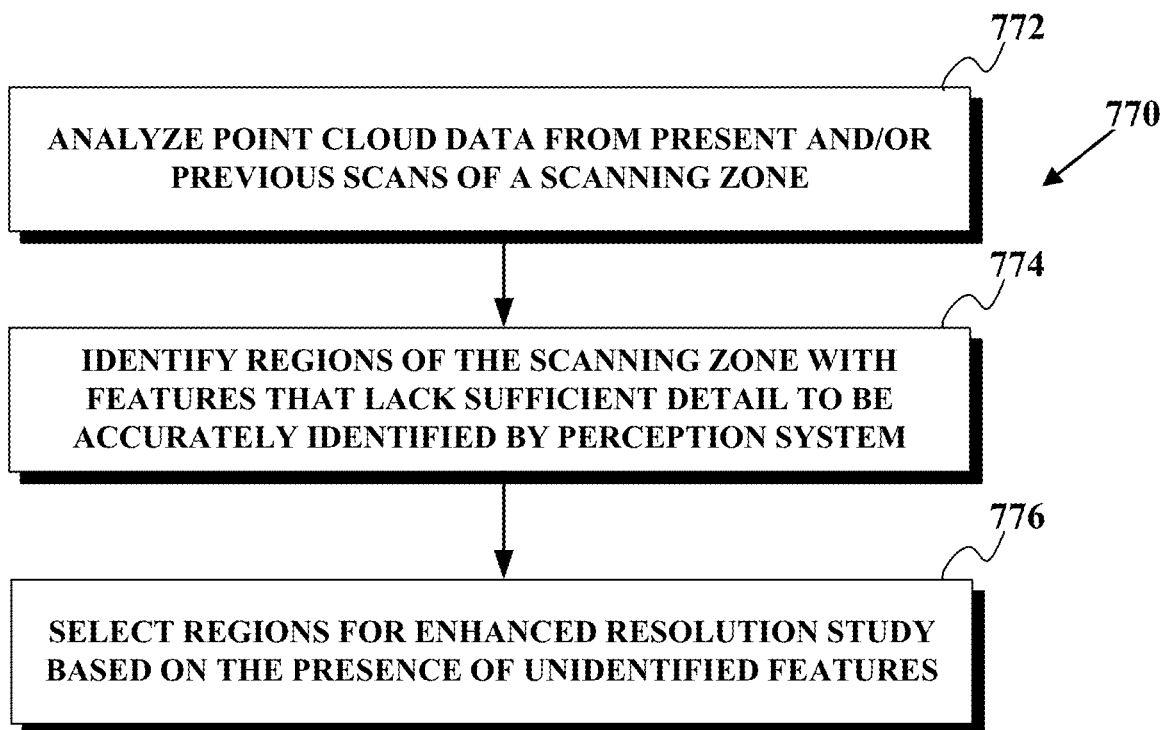
FIG. 7G is a flowchart of another process for identifying regions of a LIDAR-indicated point cloud to examine with enhanced angular resolution by detecting features that lack sufficient detail for accurate categorization or identification.

FIG. 7G is a flowchart 770 of another process for identifying regions of a LIDAR-indicated point cloud to examine with enhanced angular resolution by detecting features that lack sufficient detail for accurate categorization or identification. Hardware and/or software implemented data analysis modules analyze LIDAR-indicated point cloud data from present and/or previous scans of a scanning zone (772). Regions of the scanning zone including reflective features that cannot be identified or categorized with sufficient reliability (e.g., as indicated by an estimated probability of accurate identification) are located (774). Regions of the scanning zone are selected for enhanced resolution scanning based on the indication of unidentified reflective features in those regions (776). By scanning the unidentified reflective features with enhanced resolution, additional spatial resolution is provided so as to provide additional information with which to identify the reflective feature, and thereby provide a more accurate interpretation of the surrounding environment.

For example, reflective features can be identified by correlating clusters and/or patterns of points in the point cloud with shapes and/or surfaces defining the boundaries of the reflective feature, and cross-referencing the geometry of the shape against a library of geometries associated with possible objects, such as pedestrians, bicycles, cars, motorcycles, construction equipment, bridges, fire hydrants, mail boxes, road signs, trees, animals, combinations of these, etc. Where reflective features are not indicated with sufficient spatial resolution, such as for distant objects, it may be too difficult to reliably distinguish, based on LIDAR-indicated point clouds, whether a reflective object is a traffic cone or a fire hydrant. Thus, increasing LIDAR angular resolution in regions where an object is perceived to be located, but cannot be accurately identified allows for selectively providing additional information to identify the object.

The technique of FIG. 7G described in connection with flowchart 770 employs the output of the hardware and/or software implemented object detection system as feedback for the operation of the LIDAR system. The LIDAR system thereby selectively allocates its enhanced resolution scanning resources to regions of the scanning zone with insufficient spatial resolution to allow for reliable object detection.

In some embodiments, reliable identification of perceived objects allows for greater obstacle avoidance. For example, identified objects can be associated with typical motion and/or speed profiles that allow for enhanced prediction of future locations.

As noted above, the techniques for identifying regions of a scanning zone for enhanced resolution scanning described in connection with the flowcharts 710, 720, 730, 740, 750, 760, 770 in FIGS. 7A-7G can each individually or as a combination of one or more be implemented as block 506 of the flowchart 500 described in connection with FIG. 5A.

Figure 8:
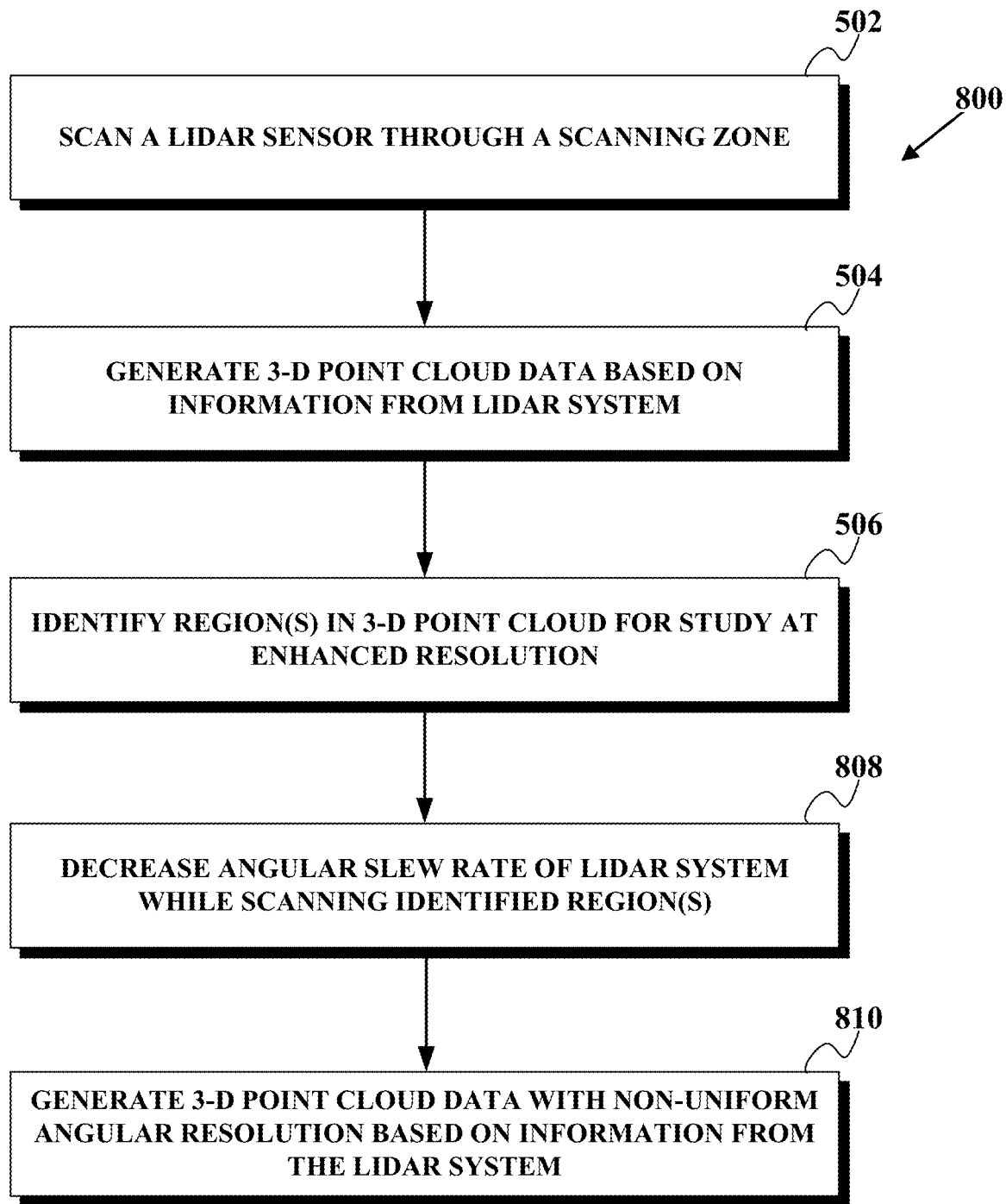
FIG. 8 is a flowchart of a process for adaptively adjusting an angular resolution of a LIDAR device by adjusting a slew rate of the LIDAR device.

FIG. 8 is a flowchart 802 of a process for adaptively adjusting an angular resolution of a LIDAR device by adjusting a slew rate of the LIDAR device. Similar to the process described in connection with the flowchart 500 in FIG. 5A, a LIDAR device is scanned through a scanning zone (502), a 3-D point cloud data is generated from the LIDAR output (504), and regions of the point cloud are identified for enhanced resolution study (506). To provide high angular resolution scanning, however, the slew rate of the beam steering optics of the LIDAR device is selectively slowed while scanning the selected regions (808). A mixed resolution 3-D point cloud is generated that includes relatively high angular resolution in the identified regions due to the small rate of the change of the beam steering optics while scanning those regions (810).

For example, for the LIDAR device 302 including an angled rotating mirror 304, the rotation rate of the angled rotating mirror 304 is temporarily slowed such that the relative angular change between successive pulses of the laser is decreased according to the rate of rotation. Thus, the slew rate of the LIDAR device referred to herein is the angular rate of change of the orientation of the laser pulses emitted from the LIDAR device. While the changing orientation is illustrated and described herein as achieved via an angled rotating mirror, the changing orientation is generally provided by beam steering optics that include a suitable combination of lenses, mirrors, apertures, etc. to effect the changing orientation of the pulsing laser described herein.

Figure 9B:
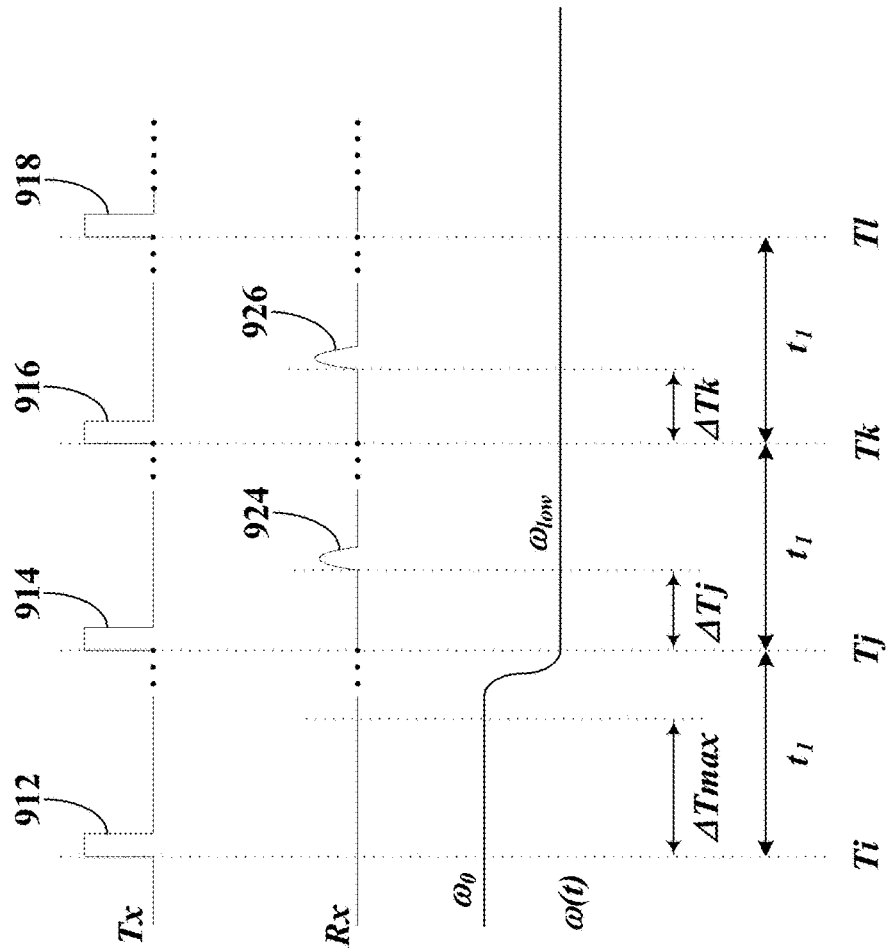
FIG. 9B is a timing diagram of the transmitted and received pulses for the exaggerated symbolic illustration of FIG. 9A.
Figure 9A:
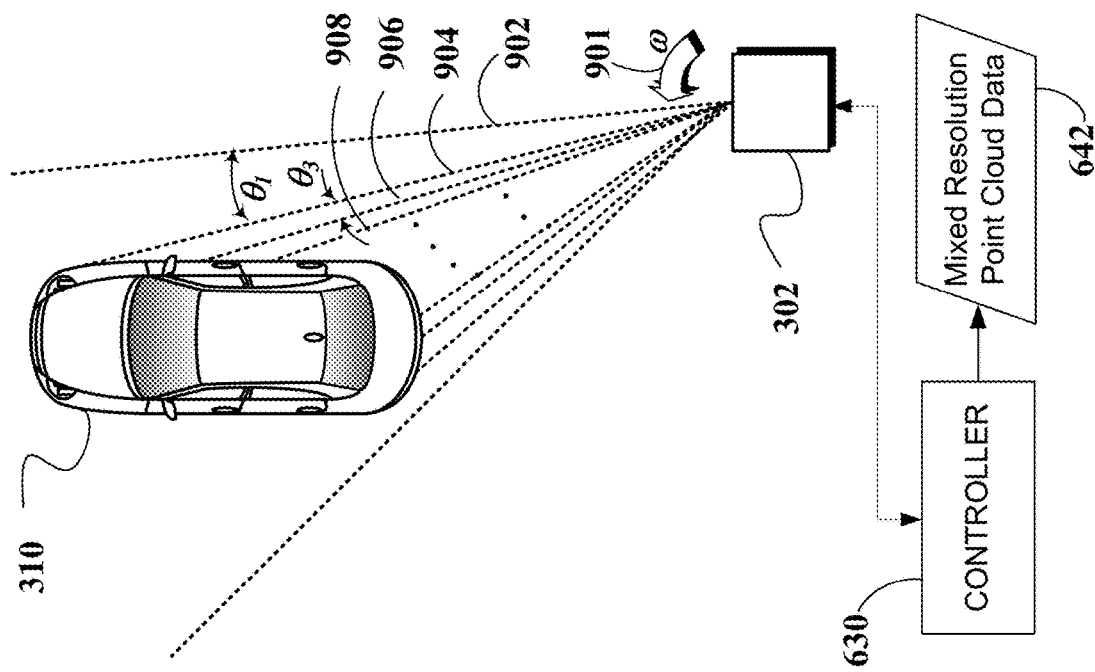
FIG. 9A symbolically illustrates a LIDAR device scanning across an example obstacle-filled environmental scene with adaptively adjusted slew rate of the LIDAR device to provide enhanced angular resolution in the vicinity of the environmental obstacle where the time-scale is exaggerated for illustrative purposes.

FIG. 9A symbolically illustrates a LIDAR device 302 scanning across an example obstacle-filled environmental scene with adaptively adjusted slew rate of the LIDAR device to provide enhanced angular resolution in the vicinity of the environmental obstacle where the time-scale is exaggerated for illustrative purposes. The LIDAR device 302 scans the laser beam in the direction indicated by directional reference arrow 901. While scanning, the laser light source in the LIDAR system 901 emits pulses separated by the duration $t_1$. Thus, the angular separation between successively emitted pulses is given approximately by the product of the angular rate of change of the beam steering optics and the interval between successive pulses (e.g., approximately the product of $\omega(t)$ and $t_1$). Thus, reducing the slew rate of the LIDAR device 302 reduces the angular separation between successively emitted pulses. The time scale of the interval between successive pulses, and the corresponding resulting angular separations, is intentionally exaggerated in FIG. 9A for illustrative purposes to show changes in angular separation. The controller 630 is arranged to receive signals from the LIDAR device 302 and/or associated optical sensors to generate the mixed resolution point cloud data 642.

FIG. 9B is a timing diagram of the transmitted and received pulses for the exaggerated symbolic illustration of FIG. 9A. Similar to the timing diagrams provided above at FIGS. 6B and 6D, the timing diagram in FIG. 9B includes symbolic indications of transmitted pulses emitted from the LIDAR device 302 (labeled "Tx"); received reflected signals detected via associated optical sensors in the sensor system 104 (labeled "Rx"); and angular rate of rotation of the beam steering optics, or LIDAR slew rate (labeled "$\omega(t)$").

In an example operation of the LIDAR device 302 according to the timing diagram of FIG. 9B, a first pulse 912 is emitted from the LIDAR device 302 at time Ti, and directed along laser beam 902. No reflected signal is detected during the period $\Delta$Tmax following time Ti. An indication of an absence of reflective features within the maximum distance of sensitivity is noted by the controller 630 in connection with the orientation of the LIDAR device 302 at time Te (i.e., the direction of laser beam 912).

At time Tj, following Ti by the duration $t_1$, a second pulse 914 is emitted from the LIDAR device 302. The second pulse 914 reaches the front passenger-side region of the car 310 resulting in a reflected signal 924. The reflected signal 924 is detected by the LIDAR device 302 and/or its associated optical sensors with a relative time delay of $\Delta$Tj following the emission at time Tj. The second pulse 914 is directed along a laser beam path 904, which is oriented with an angular separation $\theta_1$ from the beam path 902. The angular separation $\theta_1$ is approximately given by the product of $\omega_0$ and $t_1$. However, slew rate $\omega(t)$ of the beam steering optics associated with the LIDAR device 302 is decreased from $\omega_0$ to $\omega_{low}$ at time Tj to provide enhanced angular resolution scanning beginning at time Tj while the LIDAR device 302 begins scanning across the region including the car 310. As a result, the angle $\theta_1$ is more properly defined according to an integral of $\omega(t)$ from Ti to Tj, but the estimated value of $\theta_1$ is a good approximation where the slew rate adjustment is made nearly instantly at the time Tj.

The pulse 914 at time Tj marks the beginning of a temporary enhanced resolution scanning operation of the LIDAR device 302. The third pulse 916 is emitted at time Tk, which follows time Tj by an interval $t_1$. The third pulse 916 is directed along laser beam path 906, which has an orientation that differs from the direction of beam path 904 by the angle $\theta_3$. The angular separation $\theta_3$ between the two beam paths 904 and 906 is due, at least in part, to the angular rotation of beam steering optics in the LIDAR device 302 with slew rate $\omega_{low}$ (e.g., the rotating angled mirror 304 of FIG. 3A) during the interval $t_1$ between time Tj and time Tk. Thus, while the angular rate of change of orientation of the LIDAR device (such as via rotation of associated beam steering optics) is approximately constant at $\omega_{low}$, the angle $\theta_3$ is given approximately by the product of $\omega_{low}$ and $t_1$. The third pulse 916 is reflected from a point near the passenger-side door of the car 310, and a corresponding reflected signal 926 is detected by the LIDAR device 302 with relative time delay $\Delta$Tk.

A fourth pulse 918 is emitted and time Tl following time Tk by the interval $t_1$. The LIDAR device continues at the decreased slew rate $\omega_{low}$ during the interval between Tl and Tk, such that the pulse 918 is directed along laser beam path 908, which differs in orientation from the pulse 906, at least approximately, by the angle $\theta_3$. By scanning at the decreased slew rate $\omega_{low}$, the LIDAR device 302 provides enhanced angular resolution scanning even without adjusting the pulse rate of the LIDAR device 302. The enhanced resolution scanning can be continued until the LIDAR device 302 scans substantially the entire car 310 before returning to the default slew rate $\omega_0$.

The controller 630 receives indications of orientations of the LIDAR device 302 at each time point and associates each orientation with the time delay observed for reflected signals, or the absence of such signal. The information is combined to generate 3-D position mapping for each point in a point cloud surrounding the LIDAR device 302 and the resulting mixed resolution 3-D point cloud data 642 is output for further analysis.

Generally, while described separately, the techniques described herein to provide enhanced angular resolution LIDAR scans by adjusting pulse rate (FIG. 5A) or by adjusting slew rate (FIG. 8) can be combined together to provide a desired angular resolution. For example, enhanced angular resolution can be achieved by simultaneously increasing pulse rate and decreasing slew rate. Moreover, the two techniques can be employed systematically and in complementary fashion to account for respective limitations. For example, whereas decreasing slew rate can generate mechanical stresses when rapid adjustments are made, increasing pulse rate can generate thermal stresses when carried out for too long, as discussed in connection with FIG. 5B above. Thus, some embodiments of the present disclosure provide for initiating high resolution scanning by initially increasing laser pulse rate. The slew rate can be gradually slowed, rather than rapidly slowed, and the laser pulse rate can be gradually decreased in correspondence with the decrease in the slew rate such that the angular resolution achieved remains substantially similar. To allow for relatively long duration high resolution scanning, the slew rate can be slowed to an amount sufficient to set the laser pulse rate to its default value, and thereby allow the laser system to thermally regulate. At the conclusion of the enhanced resolution scan, the process can be reversed to gradually increase pulse rate while increasing pulse rate in corresponding fashion to substantially maintain the enhanced angular resolution. The slew rate returns to its default value at the conclusion of the enhanced resolution scan, at which point the laser pulse rate is also decreased to its default. The above is merely one example of a non-limiting combination of the two techniques for generating enhanced resolution LIDAR scans that is provided to facilitate to explanation and understanding.

Figure 10:
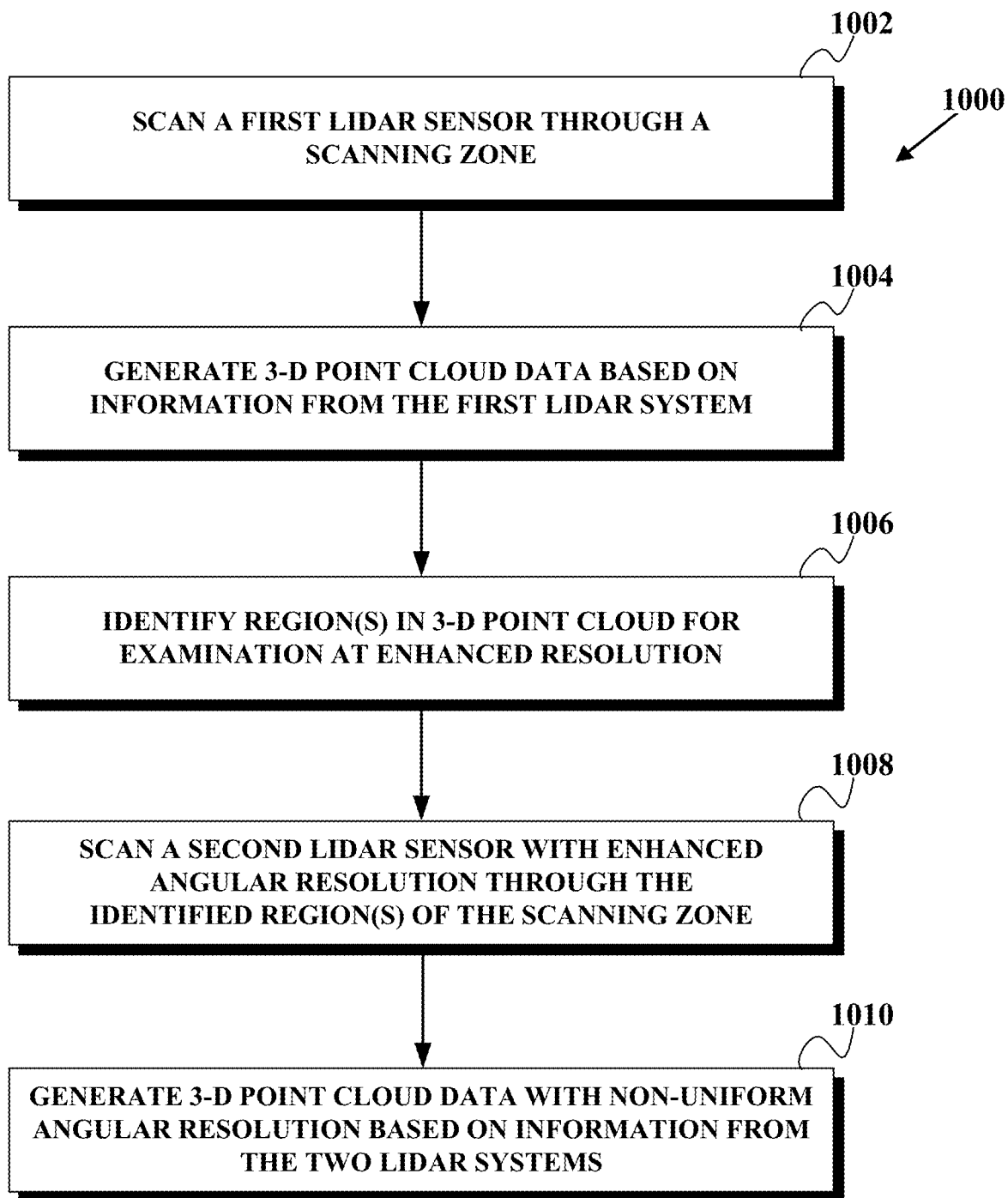
FIG. 10 is a flowchart of a process for generating a point cloud with variable angular resolution by use of a second LIDAR device with enhanced angular resolution.
Figure 11:
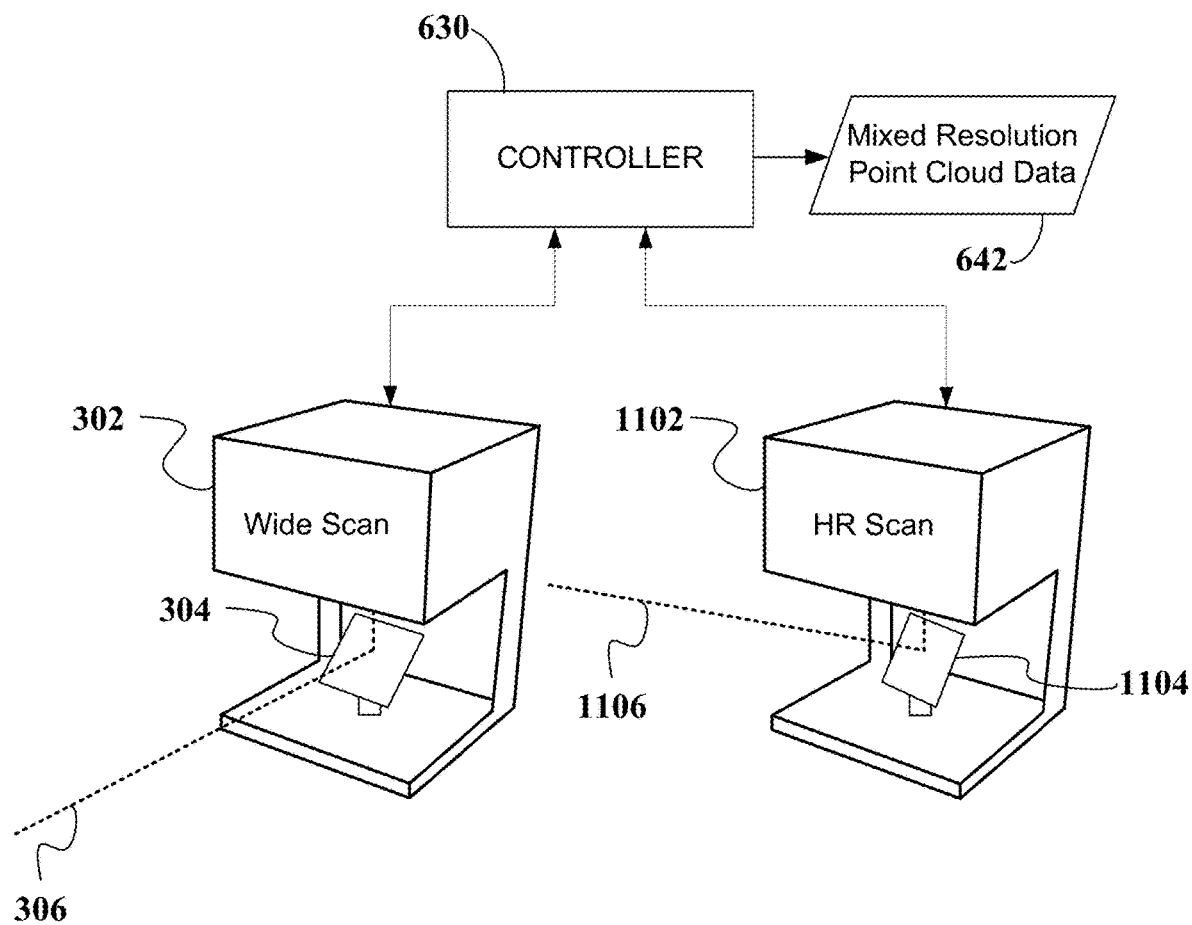
FIG. 11 is a block diagram of an obstacle detection system with two LIDAR devices where one provides enhanced angular resolution scans of regions identified according to scans from the other.

FIG. 10 is a flowchart 1000 of a process for generating a point cloud with variable angular resolution by use of a second LIDAR device with enhanced angular resolution. FIG. 11 is a block diagram of an obstacle detection system with a first LIDAR device 302 providing default resolution scans of a scanning zone and a second LIDAR device 1104 providing enhanced angular resolution scans of identified regions. The process illustrated by the flowchart 1000 is described with reference to the example two LIDAR systems shown in FIG. 11.

The first LIDAR device 302 is scanned through a scanning zone at a default resolution (1002). The first LIDAR device 302 includes a laser light source emitting pulsed laser beams (e.g. the example laser beam path 306) directed by beam steering optics, which can include a rotating angled mirror 304. The rotating angled mirror 304 is operated at a default slew rate and the laser light source is operated at a default pulse rate so as to provide complete scans of the scanning zone at an established refresh rate. In some embodiments, the angular resolution of the first LIDAR device 302 can be fixed at a suitable default value sufficient to continuously scan the scanning zone at the refresh rate.

Data from the scan by the first LIDAR device 302 and data indicating returning reflected signals is analyzed to generate a three-dimensional point cloud (1004). The 3-D point cloud can be generated by the controller 630, which can include hardware and/or software implemented modules for analyzing the data to extract time delays from returning signals, and combine the time delays with orientations of the LIDAR device 302 to generate the point cloud. The same and/or additional hardware and/or software implemented modules analyze one or more of the generated point clouds according to the techniques discussed in connection with FIGS. 7A-7G or combinations thereof to identify regions of the scanning zone for examination at enhanced resolution (1006).

Indications of the locations of the identified regions in the scanning zone are communicated to the second LIDAR device 1102, which is then operated to selectively scan the identified regions (1008). In some embodiments, the second LIDAR device 1102 is a dedicated high resolution LIDAR device that is configured to operate at enhanced angular resolution. The second LIDAR device 1102 includes beam steering optics 1104, which can be implemented as a rotating angled mirror to direct the output from a laser light source to a region of the scanning zone to be scanned (e.g., along the example laser beam path 1106). To achieve enhanced resolution with the second LIDAR device 1102, the rotating angled mirror 1104 can provide a relatively lesser slew rate than the slew rate of the first LIDAR device. Additionally or alternatively, the second LIDAR device 1102 can operate with a relatively greater laser pulse rate than the first LIDAR device 302.

Information from both LIDAR devices 302, 1102 is received at the controller 630 and combined with optical sensor data indicating reception of reflected signals, or lack thereof, to generate the mixed resolution point cloud data 642 (1010). In some embodiments, to avoid confusion in the optical sensors detecting reflected signals between pulses emitted from the two LIDAR devices 302, 1102, the two are not operated simultaneously. For example, the second LIDAR device 1102 provides selective high resolution scanning during pauses in operation of the first LIDAR device 302 between complete scans provided by the first LIDAR device 302. In some embodiments, the two LIDAR devices 302, 1102 can optionally be operated with distinguishable laser light sources that can be separately detected via the optical sensors. For example, the two LIDAR devices 302, 1102 can include laser light sources at distinct wavelengths that can be distinguished in the optical sensors so as to avoid confusion between the two even while operating the LIDAR devices 302, 1102 simultaneously. In some embodiments, the two LIDAR system can avoid sensor confusion by operating each of the LIDAR devices 302, 1102 simultaneously in distinct regions of the scanning zone that are associated with distinct optical sensors. Thus, configurations can be selected such that a single optical sensor does not simultaneously receive reflected optical signals from pulses emitted from both LIDAR devices 302, 1102.

As used herein a "scanning zone" generally refers to a region of a scanned environment scanned by a single LIDAR device, or a combination of LIDAR devices, that is completely sampled in a complete scan by the LIDAR device. That is, for a LIDAR device operated to continuously actively map its surroundings for reflective features, the scanning zone is the complete region mapped before returning to map the same point again. Generally, the scanning zone referred to herein is defined with reference to the point of view of the LIDAR device in terms of azimuth (e.g., angle along the horizon) and altitude (e.g., angle perpendicular to the horizon) with respect to the point of view of the LIDAR device. Thus, the geographic location mapped by the scanning zone of a LIDAR device is not fixed, but rather moves with the LIDAR device. For example, the scanning zone can be considered a bubble surrounding a particular LIDAR device with dimensions defined by the maximum distance sensitivity of the LIDAR device.

In some embodiments, the azimuth range of the scanning zone can be approximately 360 degrees, or a divisor thereof, such as 180, 90, 60, etc. to allow for 360 degree coverage by an even number of similar such LIDAR devices. In some embodiments, the altitude range can extend from 0 to 180 degrees. In some embodiments, the altitude range of the scanning zone can extend by an approximately equal number of degrees to either side of the horizon, such as 30 degrees either side of the horizon (60 to 120 degrees altitude), 20 degrees either side of the horizon (70 to 110 degrees altitude), etc. Of course, the altitude range can also be an incomplete coverage of the available 0 to 180 degree range that is biased above or below the horizon, such as providing coverage up to 45 degrees above the horizon and 15 degrees below the horizon (45 to 105 degrees altitude), to take just one example. Of course, as with the azimuth ranges, the altitude ranges can be divided substantially equally between multiple LIDAR devices, such as in 30 degree sections, 20 degree sections, 15 degree sections, etc.

Furthermore, a complete scan is referred to herein as being completed within a scanning interval, which can be the time required for performing a complete scan of the scanning zone. In other words, a given point in the scanning zone is generally scanned on an interval given by the scanning interval, with every other point in the scanning zone being scanned in the interim.

Figure 12:
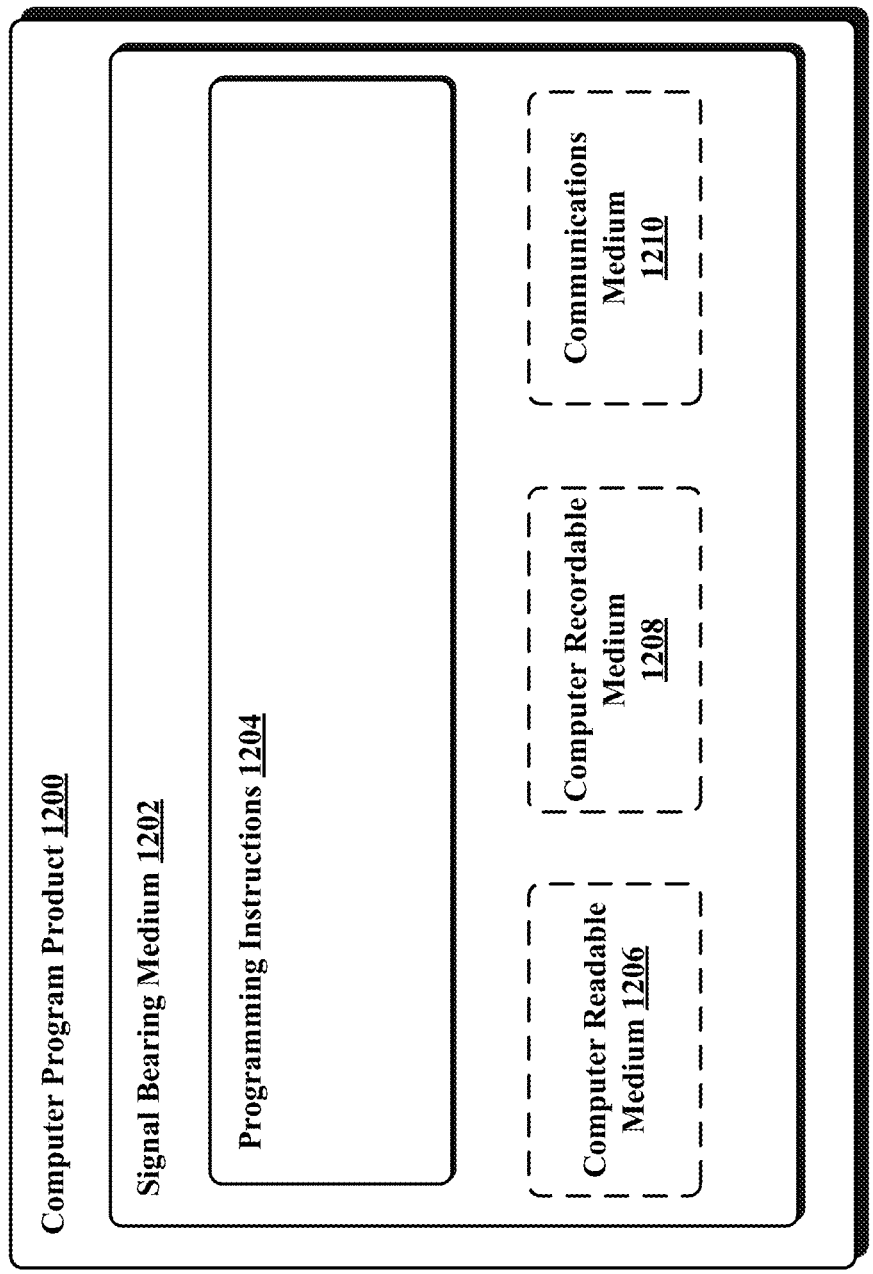
FIG. 12 depicts a computer-readable medium configured according to an example embodiment.

FIG. 12 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., the instructions 115 stored on the data storage 114 of the computer system 112 of vehicle 100). FIG. 12 is a schematic illustrating a conceptual partial view of an example computer program product that includes a computer program for executing a computer process on a computing device, arranged according to at least some embodiments presented herein.

In one embodiment, the example computer program product 1200 is provided using a signal bearing medium 1202. The signal bearing medium 1202 may include one or more programming instructions 1204 that, when executed by one or more processors may provide functionality or portions of the functionality described above with respect to FIGS. 1-11. In some examples, the signal bearing medium 1202 can be a computer-readable medium 1206, such as, but not limited to, a hard disk drive, a Compact Disc (CD), a Digital Video Disk (DVD), a digital tape, memory, etc. In some implementations, the signal bearing medium 1202 can be a computer recordable medium 1208, such as, but not limited to, memory, read/write (R/W) CDs, R/W DVDs, etc. In some implementations, the signal bearing medium 1202 can be a communications medium 1210, such as, but not limited to, a digital and/or an analog communication medium (e.g., a fiber optic cable, a waveguide, a wired communications link, a wireless communication link, etc.). Thus, for example, the signal bearing medium 1202 can be conveyed by a wireless form of the communications medium 1210.

The one or more programming instructions 1204 can be, for example, computer executable and/or logic implemented instructions. In some examples, a computing device such as the computer system 112 of FIG. 1 is configured to provide various operations, functions, or actions in response to the programming instructions 1204 conveyed to the computer system 112 by one or more of the computer readable medium 1206, the computer recordable medium 208, and/or the communications medium 1210.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A system comprising:
a light detection and ranging (LIDAR) device comprising:
a light source configured to emit at least one light pulse in accordance with at least one adjustable pulse parameter;
a light detector configured to receive returning light pulses reflected from reflective features in a scanning zone; and
beam steering optics configured to direct emitted light pulses from the light source through the scanning zone; and
a controller configured to: (a) control the LIDAR device; (b) receive from the LIDAR device data indicative of reflective features in the scanning zone; and (c) update the at least one pulse parameter based on a scanning plan, wherein the scanning plan indicates a feature of interest in the scanning zone, and wherein the scanning plan is based at least in part on the data indicative of reflective features in the scanning zone.

2. The system of claim 1, wherein the beam steering optics are configured to direct the emitted light pulses in accordance with at least one adjustable steering parameter.

3. The system of claim 2, wherein the at least one adjustable steering parameter comprises an angular rate of change between emitted light pulses.

4. The system of claim 1, wherein the at least one adjustable pulse parameter comprises a pulse rate.

5. The system of claim 1, wherein the scanning plan is further based on a baseline map.

6. The system of claim 1, wherein the scanning plan provides for the feature of interest to be scanned with enhanced resolution.

7. A method comprising:
emitting at least one light pulse in accordance with at least one pulse parameter;
detecting returning light pulses reflected from reflective features in a scanning zone and producing data indicative of the reflective features in the scanning zone;
determining a scanning plan based at least in part on the data indicative of the reflective features in the scanning zone, wherein the scanning plan indicates a feature of interest in the scanning zone; and
updating the at least one pulse parameter based on the scanning plan.

8. The method of claim 7, wherein the at least one pulse parameter comprises a pulse rate.

9. The method of claim 7, wherein the scanning plan is further based on a baseline map.

10. The method of claim 9, wherein the feature of interest is a feature that is not present in the baseline map.

11. The method of claim 7, wherein the scanning plan provides for the feature of interest to be scanned with enhanced resolution.

12. The method of claim 7, wherein the feature of interest is a type of object.

13. The method of claim 7, wherein the feature of interest is an object in motion.

14. The method of claim 7, wherein the feature of interest is based on an edge of a perceived object.

15. The method of claim 7, wherein the scanning plan is further based on an estimated location of the feature of interest.

16. The system of claim 1, wherein the feature of interest is a type of object.

17. The system of claim 1, wherein the feature of interest is an object in motion.

18. The system of claim 5, wherein the feature of interest is a feature that is not present in the baseline map.

19. The system of claim 1, wherein the feature of interest is based on an edge of a perceived object.

20. The system of claim 1, wherein the scanning plan is further based on an estimated location of the feature of interest.

* * * * *